US011905185B2

(12) United States Patent
Huffmeyer

(10) Patent No.: US 11,905,185 B2
(45) Date of Patent: Feb. 20, 2024

(54) ECO-FRIENDLY WATER FILTRATION APPARATUS

(71) Applicant: Fil2r, LLC, Los Angeles, CA (US)

(72) Inventor: Audra Alexandra Huffmeyer, Los Angeles, CA (US)

(73) Assignee: FIL2R, LLC, Los Angeles, CA (US)

(*) Notice: Subject to any disclaimer, the term of this patent is extended or adjusted under 35 U.S.C. 154(b) by 478 days.

(21) Appl. No.: 16/831,789

(22) Filed: Mar. 26, 2020

(65) Prior Publication Data

US 2020/0339437 A1 Oct. 29, 2020

Related U.S. Application Data

(60) Provisional application No. 62/838,185, filed on Apr. 24, 2019.

(51) Int. Cl.
*C02F 1/00* (2023.01)
*B01D 39/20* (2006.01)

(52) U.S. Cl.
CPC .......... *C02F 1/003* (2013.01); *B01D 39/2062* (2013.01); *B01D 2201/302* (2013.01); *B01D 2201/304* (2013.01); *B01D 2201/307* (2013.01); *B01D 2221/02* (2013.01); *C02F 2305/00* (2013.01); *C02F 2307/04* (2013.01)

(58) Field of Classification Search
CPC ............................ C02F 1/003; C02F 2307/04
See application file for complete search history.

(56) References Cited

U.S. PATENT DOCUMENTS

| 11,053,137 | B1* | 7/2021 | Knopke | B01J 20/041 |
|---|---|---|---|---|
| 2009/0057220 | A1* | 3/2009 | Nauta | C02F 1/003 |
| | | | | 210/282 |
| 2012/0061312 | A1* | 3/2012 | Busick | C02F 1/003 |
| | | | | 210/471 |
| 2015/0014233 | A1* | 1/2015 | Huda | B01D 29/21 |
| | | | | 210/188 |
| 2019/0345039 | A1* | 11/2019 | Anderson | C02F 1/003 |

* cited by examiner

*Primary Examiner* — Benjamin M Kurtz
(74) *Attorney, Agent, or Firm* — PROCOPIO, CORY, HARGREAVES & SAVITCH LLP

(57) ABSTRACT

An eco-friendly water filtration apparatus. The apparatus may comprise a lid comprising openings that allow water to flow into the apparatus, and an enclosure that is open at one end and comprises openings at the opposing end that allow water to flow out of the apparatus. The enclosure may be configured to receive a pod of activated carbon, while allowing removal of the pod, and the lid may be configured to attach to and detach from the enclosure at the enclosure's open end.

16 Claims, 17 Drawing Sheets

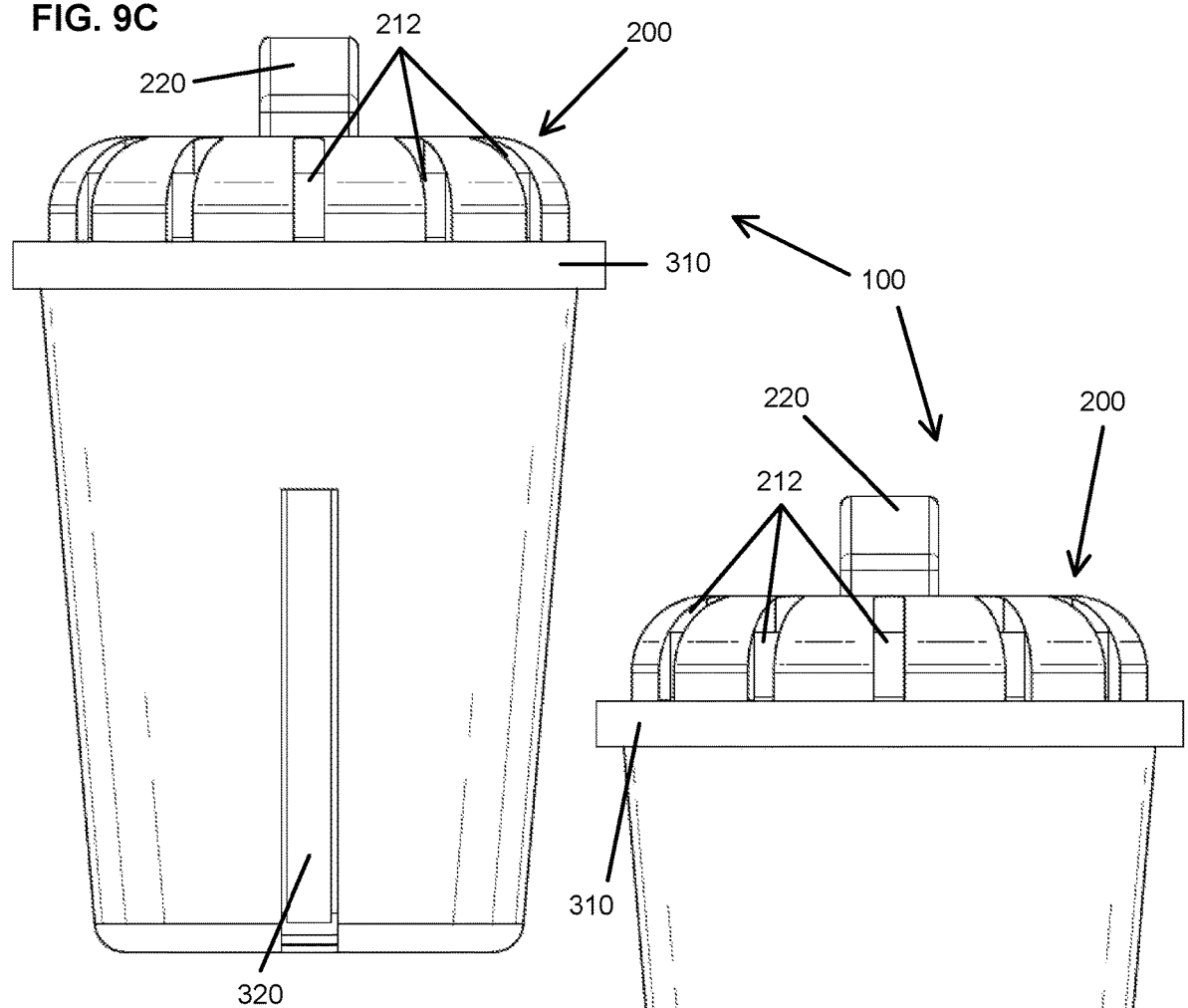

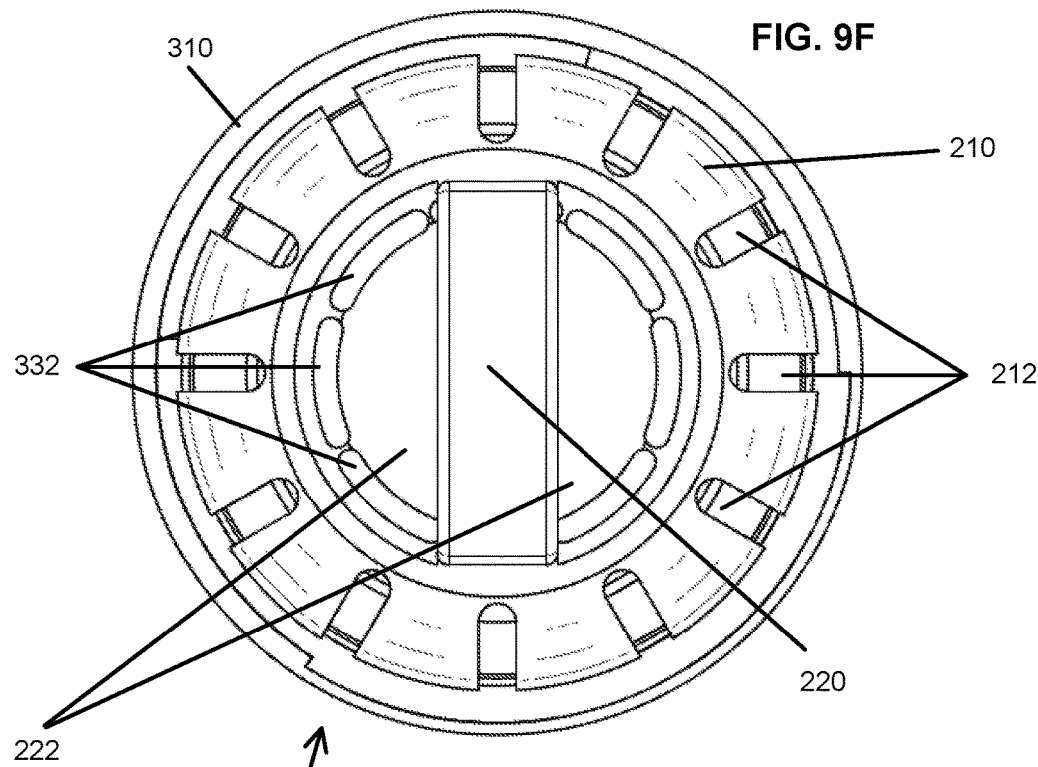
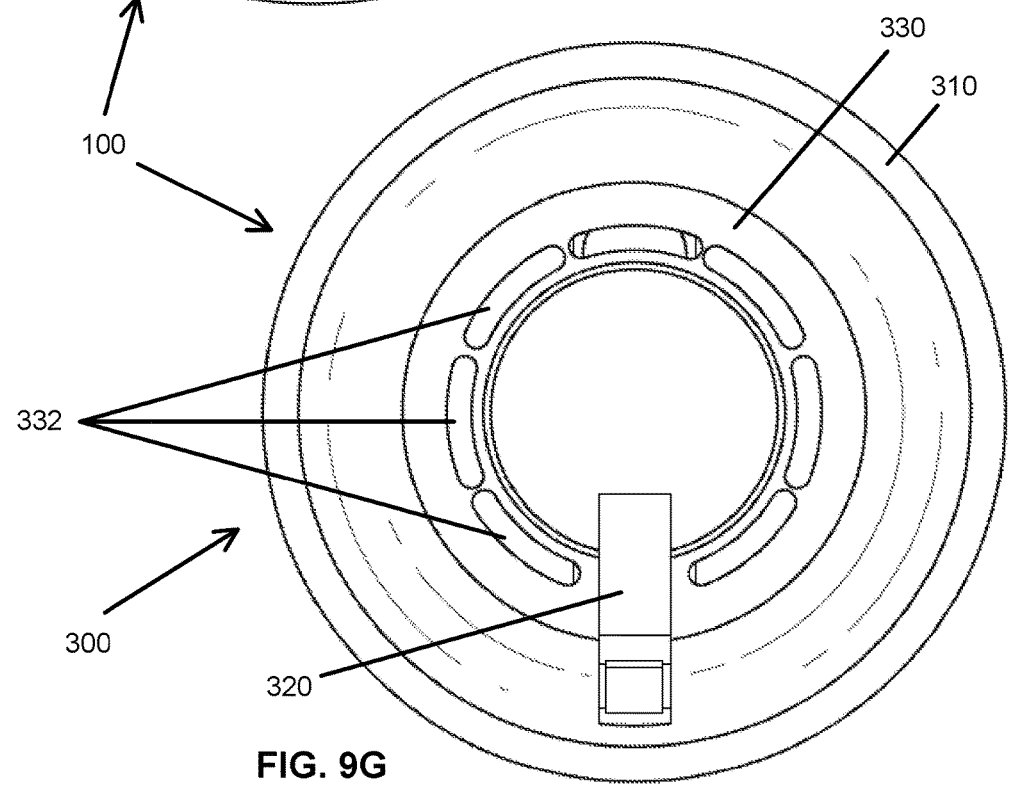

ECO-FRIENDLY WATER FILTRATION APPARATUS

CROSS-REFERENCE TO RELATED APPLICATIONS

The present application claims priority to U.S. Provisional Patent App. No. 62/838,185, filed on Apr. 24, 2019, which is hereby incorporated herein by reference as if set forth in full.

BACKGROUND

Field of the Invention

The embodiments described herein are generally directed to reusable water filters, and, more particularly, to a water filtration apparatus configured to open and close, for insertion and removal of a filter pod, and further configured to be used with a water filtration pitcher or other system designed to provide filtered water.

Description of the Related Art

Water filtration systems are commonly used to remove contaminants and impurities from municipal water systems. For example, in the context of households, water filtration pitchers (e.g., those produced by Brita™, Pur™, ZeroWater™, and the like) are commonly used to remove lead and chlorine from tap water. Typically, such water filtration systems utilize activated carbon (e.g., active charcoal carbon) to trap pollutant molecules, as the water flows through the activated carbon, through a process called adsorption.

Water filtration pitchers are an excellent alternative to bottled water, and are substantially more environmentally friendly. For instance, tens of billions of plastic water bottles are produced and sold each year, and the vast majority of them end up as litter or in landfills. Plastic is not biodegradable, and each plastic water bottle can take over a thousand years to decompose. Thus, the use of water filtration pitchers, instead of bottled water, significantly reduces the amount of plastic dumped into our environment.

However, water filtration pitchers have their own drawbacks. Specifically, in order for the filter to be effective, the activated carbon needs to be replaced every several months or so. In a conventional water filtration pitcher, this requires the consumer to remove and discard the entire plastic water filter, containing the used carbon, and insert a new plastic water filter with new carbon into the pitcher. The discarded plastic water filter cannot be opened (e.g., to remove the used carbon), and therefore, neither the plastic nor the used carbon can be easily recycled. Thus, like plastic water bottles, these discarded plastic water filters generally end up in landfills, where they may take over a thousand years to decompose.

In addition, the water filters used with current water filtration pitchers tend to leak the activated carbon into the filtered water (e.g., during handling, when bumped or shaken, etc.). While the activated carbon is not toxic, the black carbon pieces are easily visible in the water, and therefore, not aesthetically pleasing.

SUMMARY

Accordingly, an eco-friendly water filtration apparatus that may be used in water filtration systems, such as water filtration pitchers, is disclosed. In an embodiment, the water filtration apparatus comprises: a lid comprising a plurality of lid openings; and an enclosure that is open at a first end and comprising a plurality of enclosure openings at a second end that is opposite to the first end, wherein the plurality of enclosure openings are configured to permit water to flow from an interior of the enclosure to an exterior of the enclosure, and wherein the enclosure is configured to receive and contain a pod of activated carbon while allowing removal of the pod; wherein the lid is configured to attach to the enclosure and detach from the enclosure at the first end of the enclosure, and wherein the plurality of lid openings are configured to, when the lid is attached to the enclosure, permit water to flow from an exterior of the lid to an interior of the enclosure.

In an embodiment, the lid comprises a first threaded portion, the enclosure comprises a corresponding second threaded portion that is configured to mate to the first threaded portion of the lid via rotation, and the lid attaches to the enclosure via mating of the first and second threaded portions. The second threaded portion may comprise a plurality of sets of vertically stacked threads that are arranged equidistantly from each other around a top internal circumference of the enclosure.

In an embodiment, the lid comprises a peripheral portion and an internal portion, and the peripheral portion of the lid comprises at least a first subset of the plurality of lid openings. An internal region of the lid, comprising the internal portion, may comprise a second subset of the plurality of lid openings. The lid may be circular in plan view, and the first subset of openings may comprise a plurality of openings arranged in a circular pattern around the circumference of the lid. Each opening in the first subset of openings may extend longitudinally from an interior of the lid to an outer edge of the lid. The first subset of openings may comprise two or more openings that are all arranged equidistantly apart from each other. Each opening in the first subset of openings may be identical to every other opening in the first subset of openings in size and shape. The lid may be circular in plan view, and the second subset of openings may comprise two or more openings in the internal region of the lid. The internal portion of the lid may comprise a linear handle, and the two or more openings in the internal region of the lid may consist of two openings positioned on opposite sides of the linear handle and identical to each other in size and shape. Each of the two openings in the internal portion of the lid may be sized to receive a human finger through the opening, and/or may be semicircular in shape. The linear handle may comprise a tab that extends above a top surface of the peripheral portion in a side view of the lid.

In an embodiment, the enclosure is substantially cylindrical with a circular cross section. A diameter of the enclosure may decrease from the first end to the second end.

In an embodiment, the enclosure comprises a bottom surface at the second end, and the bottom surface comprises the plurality of enclosure openings. The plurality of enclosure openings on the bottom surface of the enclosure may be arranged in a circular pattern around a center of the bottom surface. The plurality of enclosure openings may be identical to each other in size and shape.

In an embodiment, the enclosure comprises at least one feature configured to mate with a corresponding feature in a filter recess in a water filtration pitcher. The at least one feature may comprise a recess in an exterior surface of the enclosure with a corresponding protrusion in an interior surface of the enclosure. A depth of the recess at an end closer to the first end of the enclosure may be less than a depth of the recess at an end closer to the second end of the enclosure, such that the corresponding protrusion in the interior surface of the enclosure is sloped towards a bottom surface of the enclosure.

In an embodiment, the enclosure comprises a lip surrounding the opening at the first end, and the lip comprises a support surface to support a periphery of a bottom surface of the lid when the lid is attached to the enclosure.

In an embodiment, the water filtration apparatus further comprises the pod of activated carbon, and the pod is configured to be inserted into the enclosure and removed from the enclosure when the lid is detached from the enclosure. The pod may comprise filter paper housing the activated carbon. The enclosure may comprise a lip surrounding the opening at the first end, the lip may comprise a support surface, the pod may comprise an annular peripheral portion at one end, and at least a portion of the support surface of the lip may contact and support a bottom surface of the peripheral portion of the pod when the pod is inserted into the enclosure.

In an embodiment, a water filtration system is disclosed that comprises: an unfiltered water tank; a filtered water tank; a filter recess positioned between the unfiltered water tank and the filtered water tank; and the water filtration apparatus of any preceding claim, wherein the water filtration apparatus is configured to be removably seated within the filter recess. The water filtration system may be a water filtration pitcher, and the filtered water tank may comprise a spout for pouring water.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 9A-9G illustrate various views of a filter container of a water filtration apparatus, according to an embodiment.

DETAILED DESCRIPTION

In an embodiment, an eco-friendly water filtration apparatus is disclosed. The water filtration apparatus may be used in water filtration systems, such as water filtration pitchers, and may be configured to contain disposable—and preferably, recyclable—pods of activated carbon. The water filtration apparatus may comprise a filter container that is configured to open and close to allow the removal of an old pod and the insertion of a new pod. Thus, the pods may be replaced, and the discarded pods may be recycled (e.g., every two months), independently of the filter container. In addition, the filter container may be reused and eventually recycled (e.g., after a number of uses, if it breaks, etc.) independently of the activated carbon in the disposable pods. Such a design is more sustainable and eco-friendly, since the components of the water filtration apparatus can be easily and independently recycled, instead of the entire water filter ending up in a landfill. In an embodiment, the water filtration apparatus may also reduce, limit, or eliminate the leakage of activated carbon into the filtered water.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Filter Container

Figure 1A:
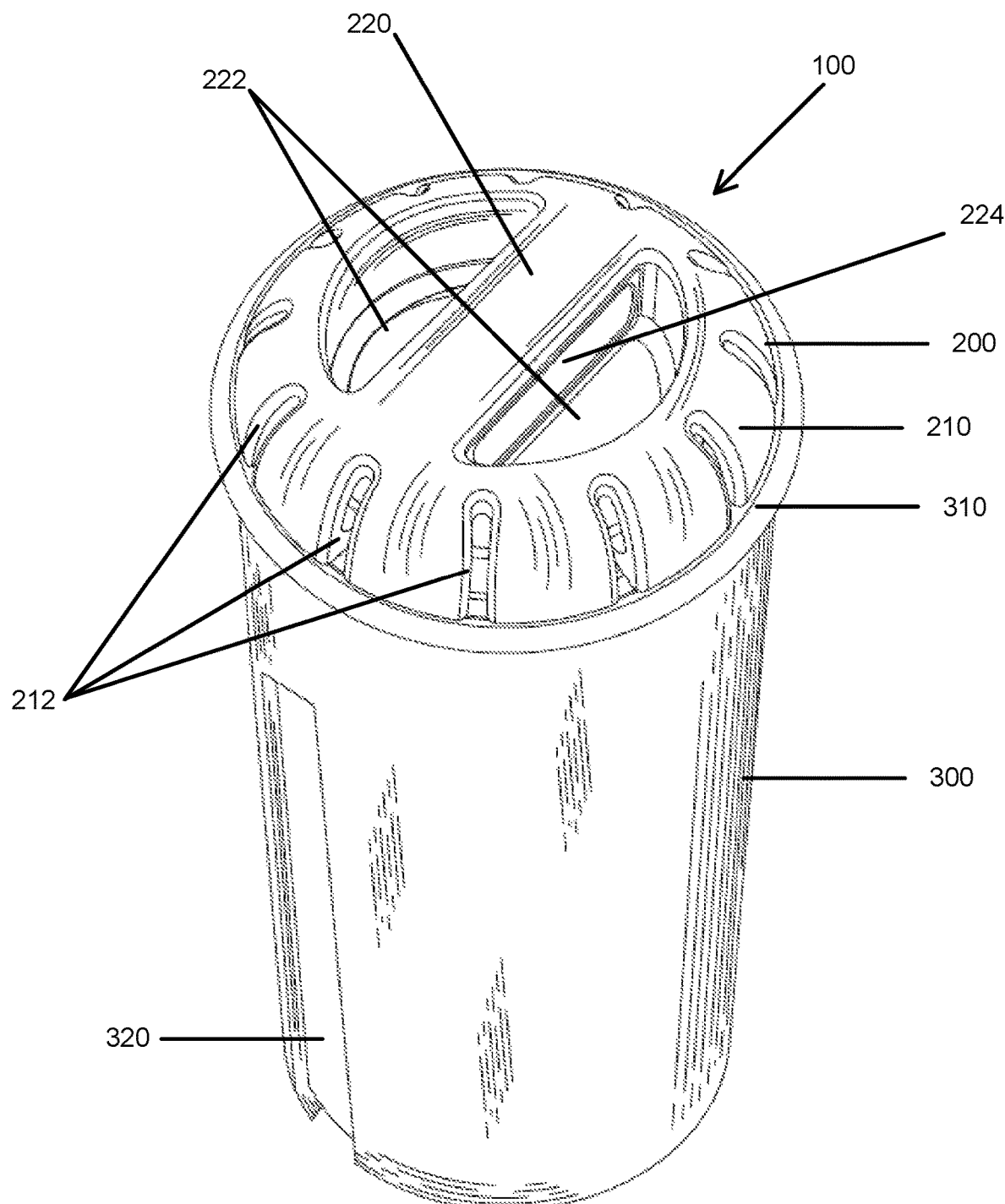
FIG. 1A illustrates the top and side of a closed filter container of a water filtration apparatus in perspective, according to an embodiment.

FIG. 1A illustrates the top and side of a closed filter container of a water filtration apparatus in perspective, according to an embodiment. Filter container 100 comprises a lid 200 and an enclosure 300. In the illustrated embodiment, lid 200 and enclosure 300 have a circular profile in plan view, and enclosure 300 is substantially cylindrical. However, other shapes are possible for lid 200 and/or enclosure 300. While filter container 100 will be primarily described herein for use with a water filtration pitcher, it should be understood that filter container 100 may be used with or adapted for other water filtration systems (e.g., a water filtration system for a residential or commercial plumbing system).

In an embodiment, lid 200 comprises a peripheral portion 210 and an internal portion 220. Lid 200 is configured to fixably attach to enclosure 300 to transition to a closed configuration and detach from enclosure 300 to transition to an open configuration. For example, the bottom of peripheral portion 210 on lid 200 may comprise a circular threaded portion on an outer circumference that mates with a corresponding threaded portion on an inner circumference of a lip 310 of enclosure 300. Thus, the threaded portion on the bottom of peripheral portion 210 of lid 200 can be screwed into and out of the corresponding threaded portion of lip 310 on enclosure 300 to thereby transition filter container 100 between its closed and open configurations. However, other attachment mechanisms are contemplated for alternative embodiments, such as a friction fit (e.g., between a circular portion on the bottom of peripheral portion 210 that has a slightly smaller diameter than lip 310 and/or may be compressible), magnetic attraction (e.g., between one or more magnets fixed to lid 200 and/or enclosure 300 and corresponding magnets or metal components fixed to the other one of the lid 200 and/or enclosure 300), and/or the like.

In an embodiment, lid 200 comprises at least one, and preferably a plurality of, openings which allow water to flow through lid 200. When filter container 100 is closed (i.e., lid 200 is attached to enclosure 300), water may pass from the exterior of filter container 100, through the opening(s) in lid 200, into the interior of enclosure 300. In general, during use within a water filtration pitcher, filter container 100 may be placed within a corresponding filter recess, for example, within an unfiltered water tank of the pitcher, or alternatively, within the filtered water tank of the pitcher. The filter recess will typically have an inner shape (e.g., diameter in an embodiment in which enclosure 300 and the filter recess are substantially cylindrical) that substantially matches the outer shape of enclosure 300, such that enclosure 300 fits snugly within the filter recess, while lid 200 protrudes from the top of the filter recess and the bottom surface of lid 200 is substantially flush with an interior bottom surface of the unfiltered water tank. Thus, water can flow from the unfiltered water tank through the opening(s) in lid 200 into enclosure 300 within the filter recess (e.g., via gravity). The filter recess will also generally have one or more openings on or near its bottom surface, corresponding to one or more openings 332 in enclosure 300, which are described elsewhere herein, to thereby enable filtered water within enclosure 300 to flow into the filtered water tank of the pitcher (e.g., via gravity). More generally, regardless of where the filter recess is positioned and whether a filter recess is even used, filter container 100 is positioned between the unfiltered and filtered water tanks and allows water to flow from the unfiltered water tank, through filter container 100, into the filtered water tank. Specifically, the unfiltered water tank may be positioned above the filtered water tank, with filter container 100 positioned between the two, such that gravity pulls water from the unfiltered water tank, through filter container 100, into the filtered water tank. Alternatively, a pump could be used to pull water through filter container 100. In any case, the filtered water tank will usually comprise a spout that allows water to be poured out of the filtered water tank to an exterior of the pitcher (e.g., into a consumer's cup or water bottle).

In the illustrated embodiment, peripheral portion 210 of lid 200 comprises a plurality of openings 212 (e.g., twelve openings). Each opening 212 may be shaped as a slit that extends longitudinally from an inner portion of peripheral portion 210 to the outer edge of peripheral portion 210. Openings 212 may be identical to each other in shape and size and equidistant from each other around the periphery of peripheral portion 210. However, openings 212 could also have different shapes, sizes, and distances from each other.

As shown, peripheral portion 210 of lid 200 may gradually slope down from the top surface of lid 200 to the bottom surface of lid 200. Openings 212 may extend through the outer, bottom edge of peripheral portion 210. Advantageously, in an embodiment in which the bottom surface of lid 200 is flush with the interior bottom surface of the unfiltered water tank, when inserted within the filter recess of a water filtration pitcher, this enables water at the very bottom of the unfiltered water tank of the pitcher to flow through lid 200.

In the illustrated embodiment, lid 200 also comprises two substantially semicircular or crescent shaped openings 222 through the top surface of lid 200. As shown, internal portion 220 extends from one side of peripheral portion 210 to the opposite side of peripheral portion 210 to thereby divide openings 222 from each other. However, it should be understood that other configurations are possible. For example, the top surface of lid 200 may comprise no opening, a single opening (e.g., a circle in the center of peripheral portion 210), four openings (e.g., internal portion 220 may form a cross with four wedge-shaped openings in each corner), and any other number of openings. Regardless of the configuration, opening(s) 222 allow water to flow from the unfiltered water tank of the pitcher, through lid 200, and into enclosure 300 (e.g., via gravity).

Together, openings 212 and 222 permit water to flow through lid 200 from the top and sides. The use of a significant number of openings (e.g., openings 212 and 222) can be used to reduce the plastic surface area of lid 200, as well as to increase water flow through lid 200. The number and arrangement of openings may be selected so as to minimize the plastic surface area of lid 200, while maintaining sufficient rigidity and strength in the plastic surface area of lid 200 to allow torque to be applied to lid 200 (e.g., during attachment and detachment of lid 200 from enclosure 300, for example, via rotation) without the occurrence of breaking or cracking in lid 200.

Advantageously, in the illustrated embodiment, in which internal portion 220 is linear from one side of peripheral portion 210 to the opposite side of peripheral portion 220, the linear internal portion 220 may act as a linear handle that allows a consumer to easily rotate lid 200. For instance, when threading is used as the attachment mechanism between lid 200 and enclosure 300, the consumer may squeeze the side surfaces 224 of internal portion 220 (e.g., between the consumer's thumb and index finger) through openings 222 to twist internal portion 220, and thereby lid 200. In this manner, internal portion 220, and thereby lid 200, may be rotated one rotational direction (e.g., clockwise) to screw or tighten lid 200 to enclosure 300 and the opposite rotational direction (e.g., counterclockwise) to unscrew or loosen lid 200 from enclosure 300. At least a portion of side surfaces 224 of internal portion 220 may be roughened, comprise a roughened fixture, and/or be recessed to facilitate gripping of the consumer's fingers to side surfaces 224 during rotation.

Figure 1B:
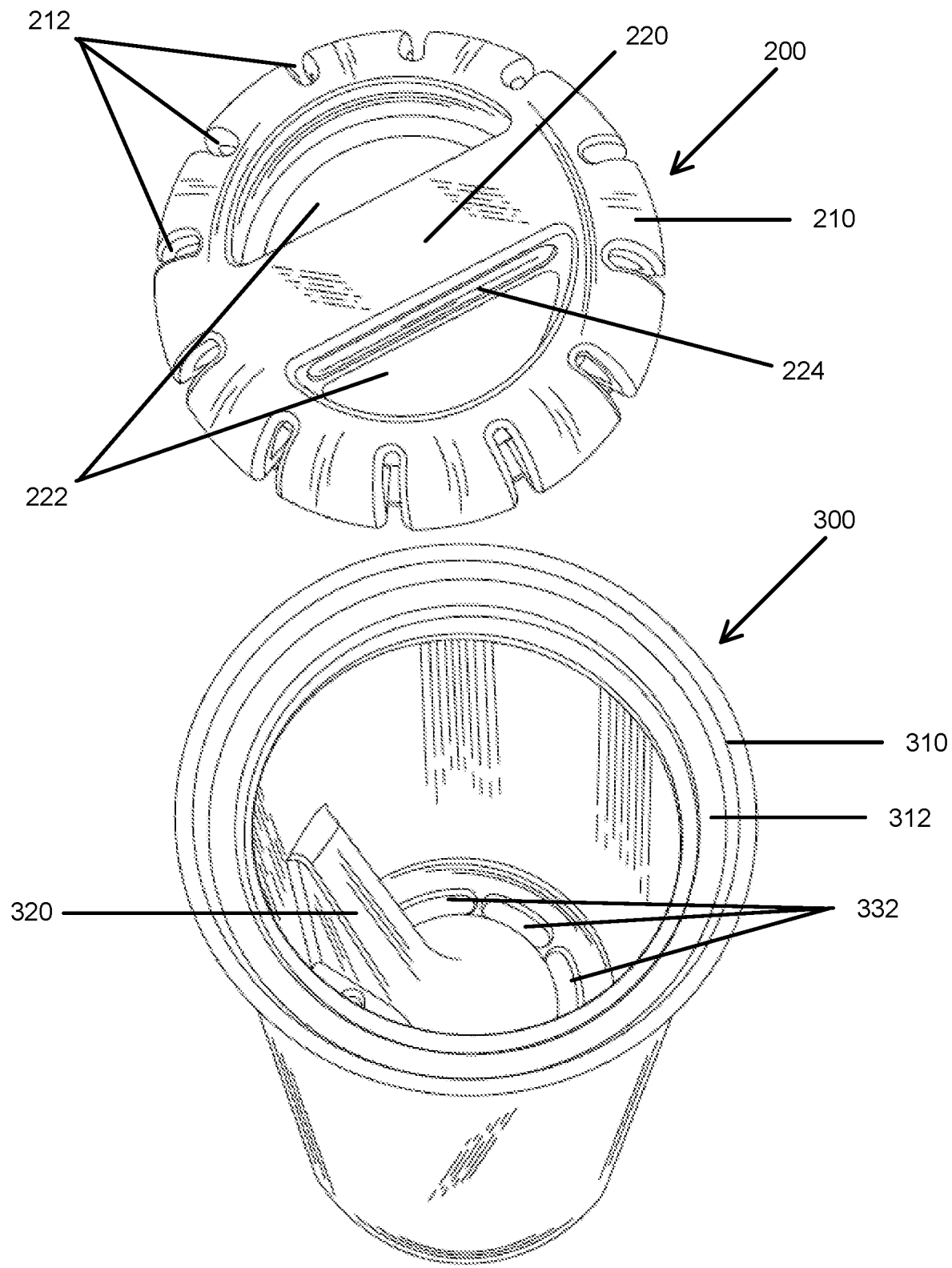
FIG. 1B illustrates the top and side of an opened filter container of a water filtration apparatus in perspective, according to an embodiment.

FIG. 1B illustrates the top and side of an opened filter container of a water filtration apparatus in perspective, according to an embodiment. In contrast to FIG. 1A, FIG. 1B illustrates the inside of enclosure 300. Lip 310 of enclosure 300 may comprise a peripheral support surface 312 around the top edge of enclosure 300 that faces lid 200. Peripheral support surface 312 may be configured to support the periphery of the bottom surface of lid 200 when lid 200 is attached to enclosure 300. Alternatively or additionally, peripheral support surface 312 and/or an additional support surface (e.g., below peripheral support surface 312) may be configured to support a peripheral lip of a pod that has been inserted into enclosure 300.

In an embodiment, enclosure 300 may comprise one or more features 320 which may be configured to guide the seating of enclosure 300 within the filter recess of a water filtration pitcher or other water filtration system. For example, these feature(s) 320 may require filter container 100 to sit within the recess in only a finite number of relative arrangements, (e.g., a single arrangement, two arrangements, three arrangements, etc.).

In the illustrated embodiment, enclosure 300 comprises a single feature 320 that comprises a recess on the exterior surface of enclosure 300 and a corresponding protrusion on the interior surface of enclosure 300. Feature 320 may mate with a corresponding feature within the filter recess. For example, the recess on the exterior surface of enclosure 300 may match in shape and size to a protrusion on the interior surface of the filter recess. Thus, enclosure 300 may only be inserted within the filter recess when the recess of feature 320 is aligned with the matching protrusion of the corresponding feature within the filter recess. More generally, the enclosure may only be inserted within the filter recess when the one or more feature(s) 320 of the enclosure align with the corresponding feature(s) within the filter recess.

In the illustrated embodiment, feature 320 is sloped from an interior side surface of enclosure 300 to a central portion of the interior bottom surface of enclosure 300. The corresponding feature in the filter recess may be similarly sloped. Advantageously, the slope of the features may allow the filter container 100 to be gently eased into the filter recess (e.g., by a consumer).

In an embodiment, enclosure 300 comprises at least one, and preferably a plurality of, openings 332 in or near the bottom surface of enclosure 300. In the illustrated embodiment, enclosure 300 comprises a plurality of openings 332 through the bottom surface of enclosure 300. Alternatively or additionally, a plurality of openings may be arranged in a bottom side surface of enclosure 300.

As shown, plurality of openings 332 are arranged in a substantially circular pattern in the bottom surface of enclosure 300. However, it should be understood that openings 332 may be arranged in other patterns. In addition, the arrangement of openings 332 may be disrupted by feature(s) 320. For example, in the illustrated embodiment, the circular arrangement of openings 332 is interrupted by feature 320, through which there are no openings. Alternatively, feature(s) 320 may not disrupt the arrangement of openings 332 and/or may comprise openings to allow water to flow between the interior and exterior of enclosure 300.

As mentioned elsewhere herein, openings 332 may correspond to opening(s) within the filter recess of a water filtration pitcher or other water filtration system. Feature(s) 320 may ensure that, when filter container 100 is inserted within the filter recess, openings 332 are aligned with their corresponding openings in the filter recess. It is not necessary to have a one-to-one correspondence between openings 332 and openings within the filter recess, as long as a profile of the openings within the filter recess overlaps the profiles of openings 332. For example, the filter recess may comprise a single opening which is coextensive with all of openings 332, such that filtered water may flow directly through all of openings 332 into the filtered water tank of a water filtration pitcher. Alternatively, there may be a one-to-one correspondence between openings 332 and openings within the filter recess. In this case, the openings in the filter recess may have the same arrangement, positioning, and pattern as openings 332.

Figure 1C:
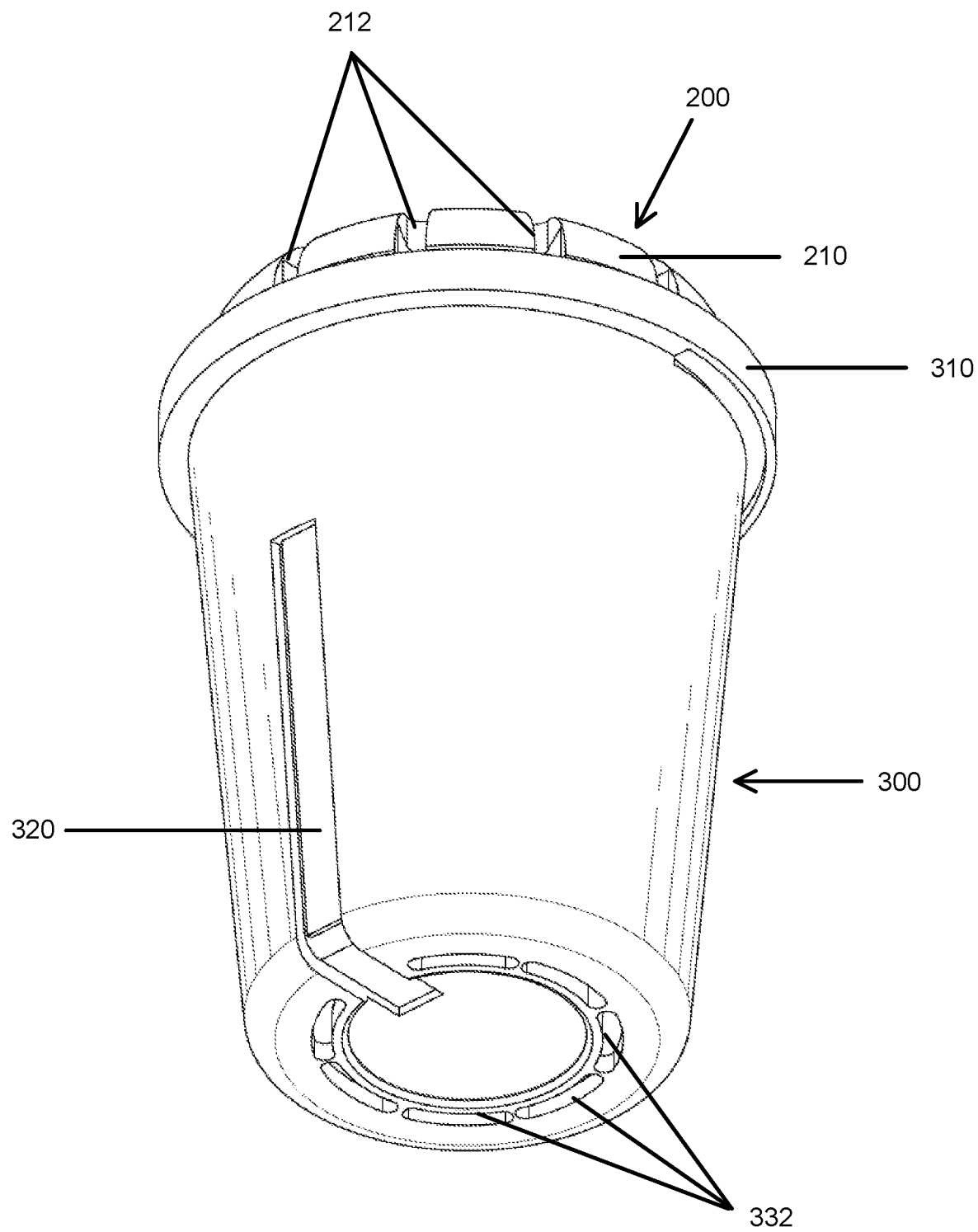
FIG. 1C illustrates the bottom and side of a closed filter container of a water filtration apparatus in perspective, according to an embodiment.

FIG. 1C illustrates the bottom and side of a closed filter container of a water filtration apparatus in perspective, according to an embodiment.

Figure 1D:
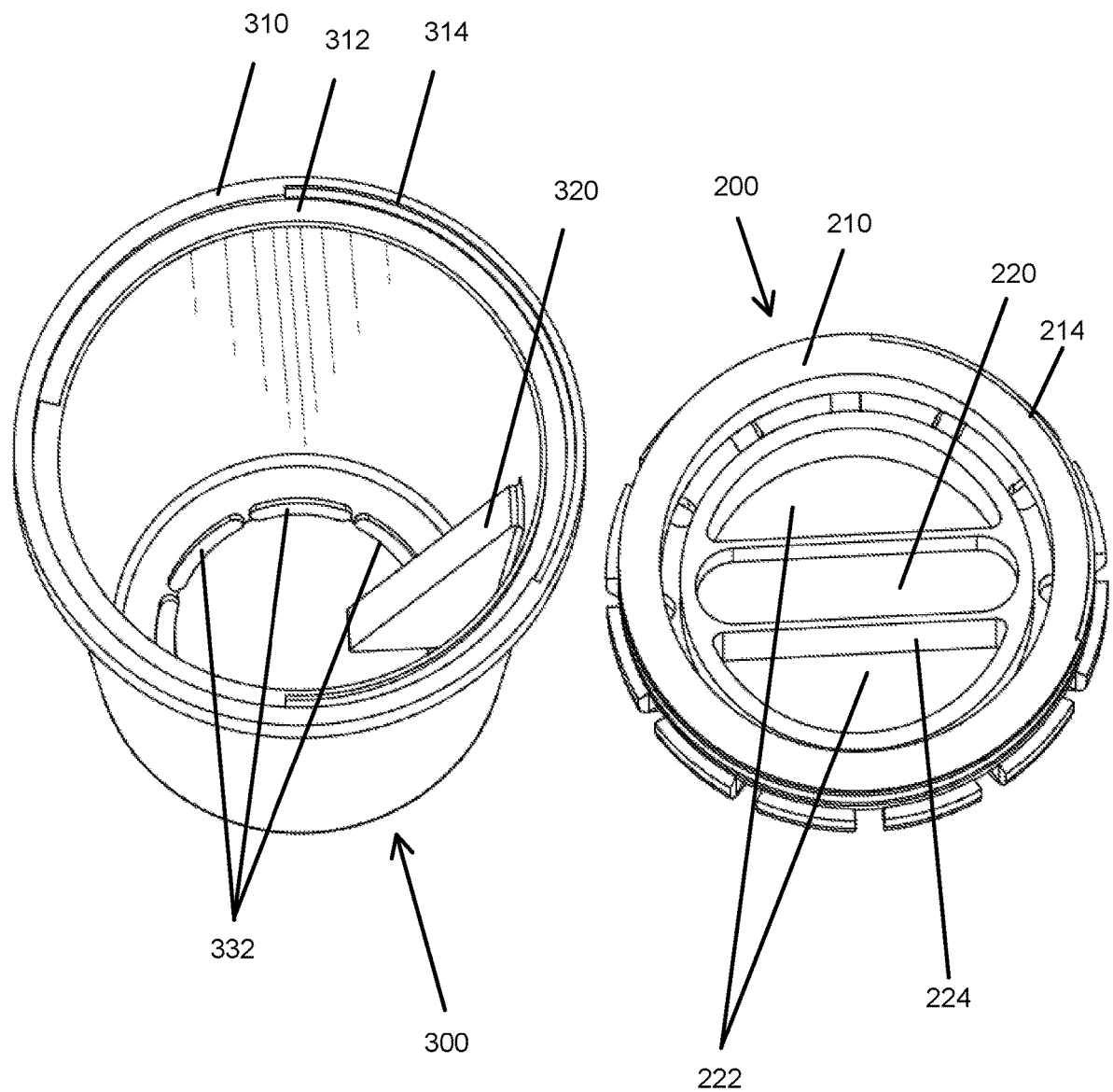
FIG. 1D illustrates the top and side of an opened filter container of a water filtration apparatus in perspective, as well as the bottom of the detached lid of the filter container, according to an embodiment.

FIG. 1D illustrates the top and side of an opened filter container of a water filtration apparatus in perspective, as well as the bottom surface of the detached lid, according to an embodiment. As illustrated, lip 310 on enclosure 300 may comprise an annular threaded side portion 314 around its interior circumference. In addition, peripheral portion 210 of lid 200 may comprise an annular threaded side portion 214 around its exterior circumference. The diameter of threaded side portion 314 may be the same as or slightly larger than the diameter of threaded side portion 214. Threaded side portion 214 on lid 200 may be configured to thread into threaded side portion 314 on lip 310 of enclosure 300 via rotation, so as to fixably attach lid 200 to enclosure 300.

As shown, internal portion 220 of lid 200 may comprise a recess. While this is not a necessary feature of lid 200 and may be omitted in alternative embodiments, it further reduces the amount of plastic used to construct lid 200. In an alternative embodiment, this recess may be converted into an opening through internal portion 220 of lid 200, to allow more water to flow through lid 200. While this would further reduce the amount of plastic used to construct lid 200, it may not be preferable because it may also weaken the structure of lid 200.

Figure 1E:
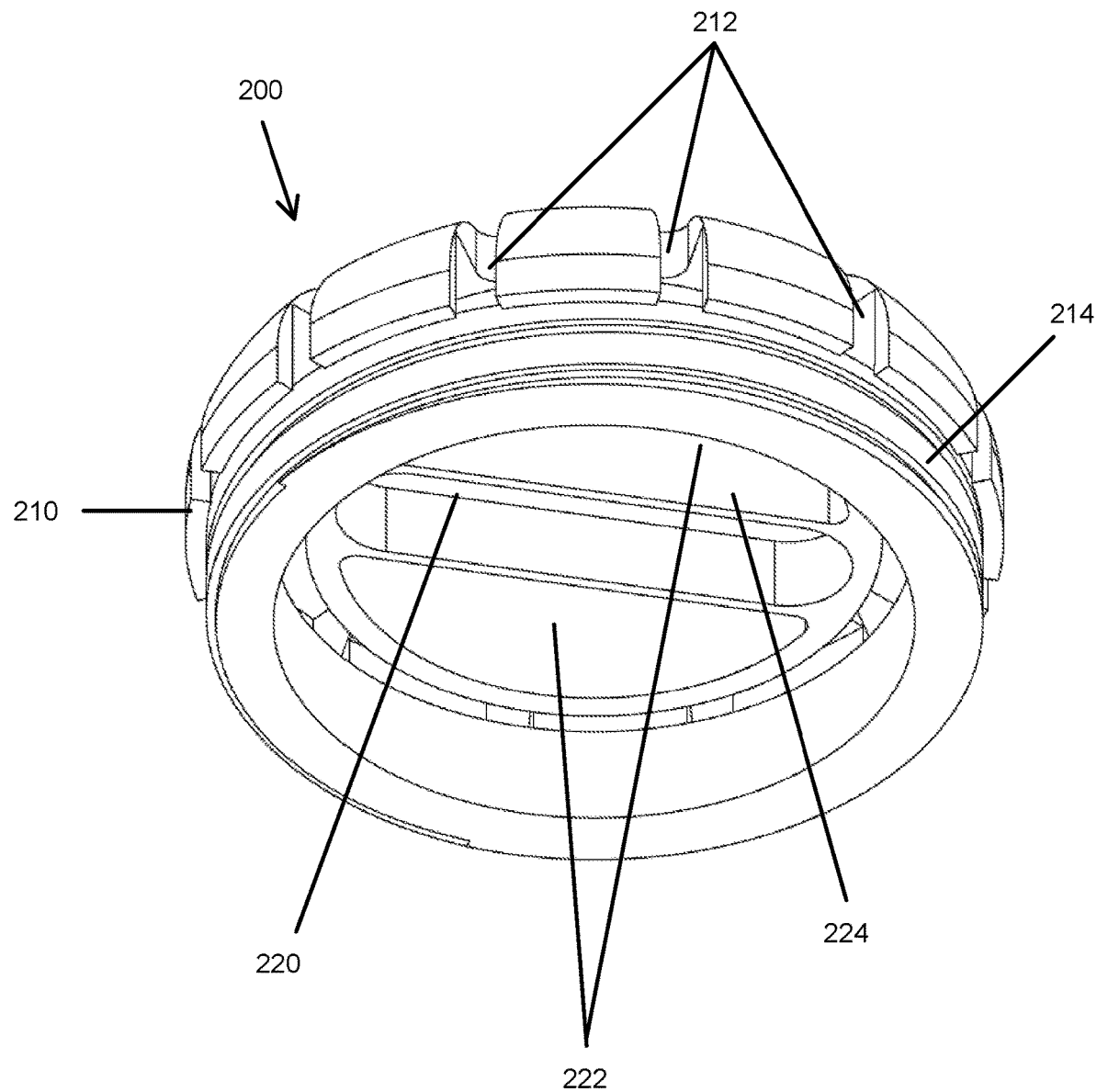
FIG. 1E illustrates the bottom and side of the lid of an opened filter container of a water filtration apparatus in perspective, according to an embodiment.

FIG. 1E illustrates the bottom and side of the lid of an opened filter container of a water filtration apparatus in perspective, according to an embodiment. In FIG. 1E, threaded side portion 214 of peripheral portion 210 of lid 200 is shown in further detail. Again, threaded side portion 214 may be configured to releasably mate with a corresponding threaded side portion 314 of lip 310 on enclosure 300, via rotation.

Figure 2A:
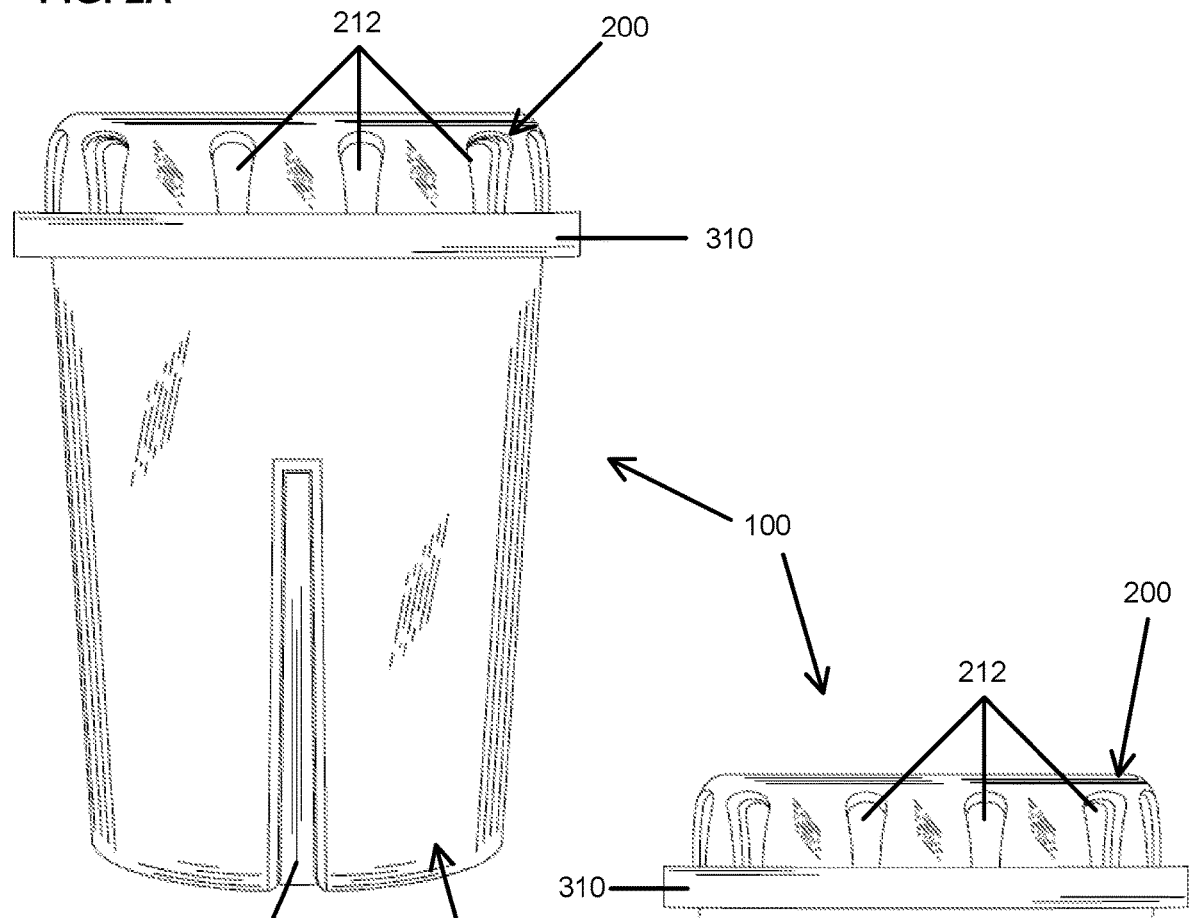
FIGS. 2A and 2B illustrate the sides of a closed filter container of a water filtration apparatus, according to an embodiment.

FIG. 2A illustrates the side of a closed filter container of a water filtration apparatus, according to an embodiment. As shown, the side of enclosure 300 may comprise at least one feature 320. In the illustrated embodiment, feature 320 comprises a recess within the exterior surface of enclosure 300 that corresponds to a protrusion in the surface of the filter recess into which filter container 100 is to be seated. Alternatively, feature 320 may comprise a protrusion from the exterior surface of enclosure 300 that corresponds to a recess in the surface of the filter recess into which filter container 100 is to be seated.

In an embodiment, enclosure 300 may have a smaller cross-sectional area in plan view at the bottom (i.e., on the distal end opposite lip 310) than at the top (i.e., on the proximal end comprising lip 310). For example, in the illustrated embodiment in which enclosure 300 is substantially cylindrical, the diameter of enclosure 300 may gradually decrease along the axis from the proximal end to the distal end. The slope created by this gradual increase in diameter may match the internal slope of the filter recess into which filter container 100 is to be seated. In other words, the diameter of the filter recess may also decrease from its proximal end to its distal end. Advantageously, these matching slopes allow the filter container 100 to be eased into the filter recess. It should be understood that the interior diameter of the filter recess should match (e.g., be slightly larger than) the exterior diameter of enclosure 300 at all cross-sections in plan view, when filter container 100 is seated within the filter recess.

Figure 2B:
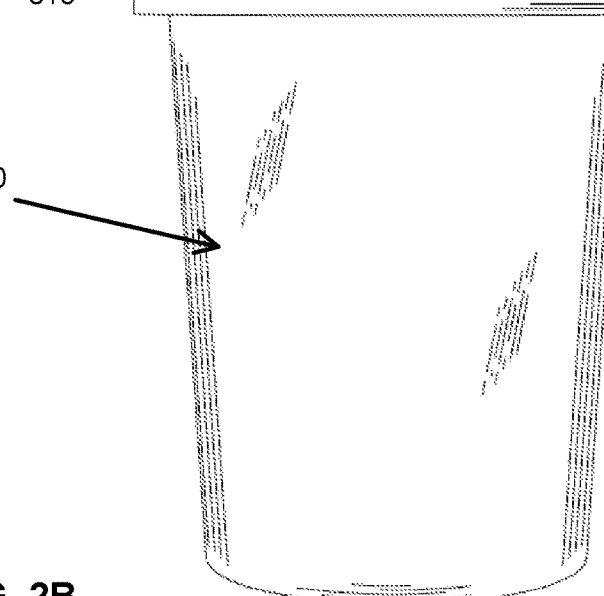

FIG. 2B illustrates the side of a closed filter container of a water filtration apparatus, according to an embodiment. As shown, one or more sides or portions of the side of enclosure 300 may not comprise any feature 320.

Figure 3:
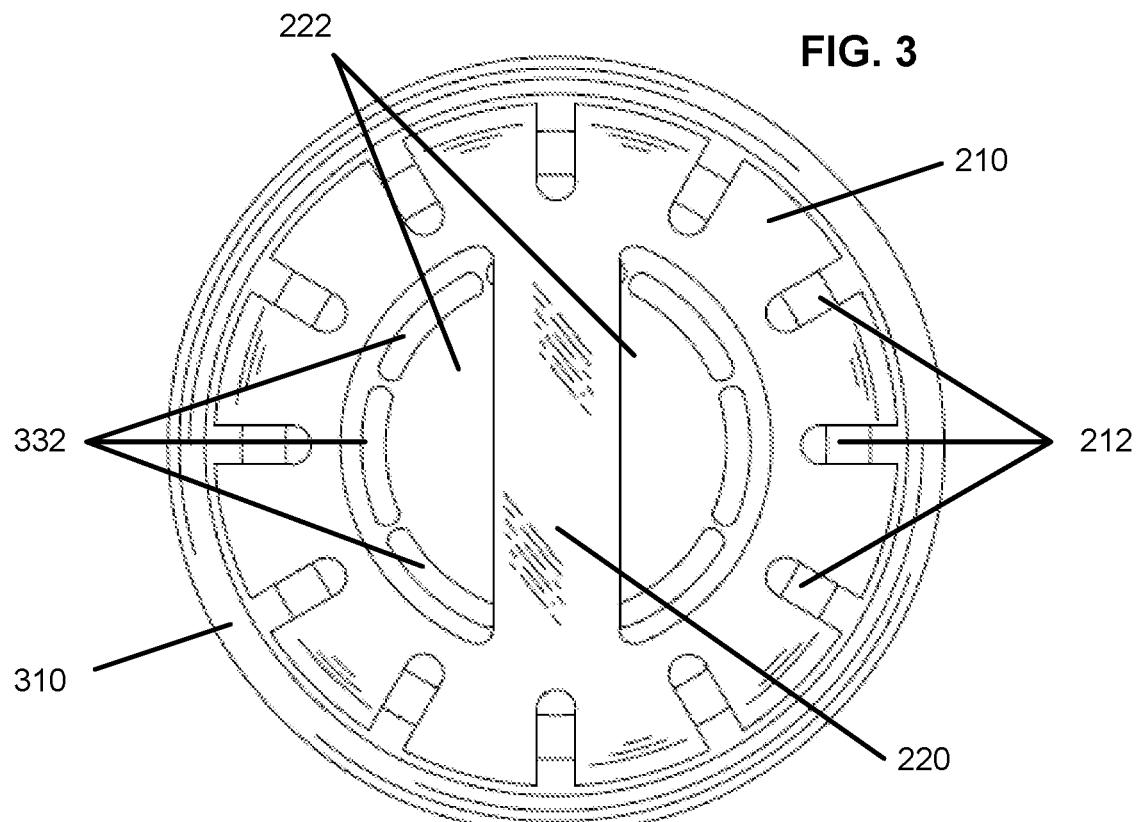
FIG. 3 illustrates a top view of a closed filter container of a water filtration apparatus, according to an embodiment.

FIG. 3 illustrates a top view of a closed filter container of a water filtration apparatus, according to an embodiment. As shown, the profile of openings 222 may overlap the profile of at least a portion of openings 332 in plan view. In other words, in plan view, an imaginary circle that includes the curved edges of openings 222 has a diameter that is larger than or equal to the circular arrangement of openings 332, such that the imaginary circle encircles all of openings 332. While this is not a necessary characteristic, it may facilitate the flow of water from openings 222 through openings 332.

Figure 4:
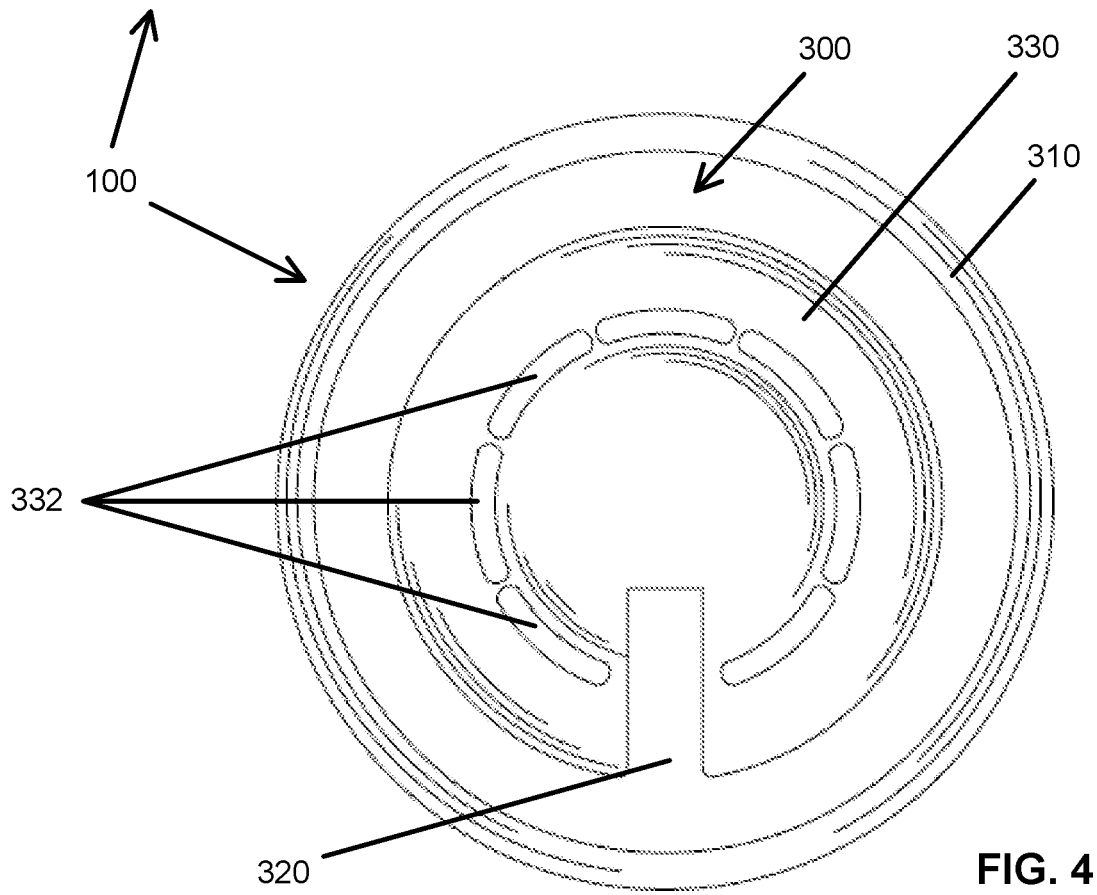
FIG. 4 illustrates a bottom view of a filter container of a water filtration apparatus, according to an embodiment.

FIG. 4 illustrates a bottom view of a filter container of a water filtration apparatus, according to an embodiment. In the illustrated embodiment, enclosure 300 comprises a bottom surface 330. Bottom surface 330 may comprise openings 332 that allow water to pass from the interior of enclosure 300 to the exterior of bottom surface 330, such that filtered water may flow from the interior of enclosure 300 to the exterior of enclosure 300. In addition, one or more features 320 (e.g., comprising a recess in the exterior surface of enclosure 300) may extend through the bottom surface of enclosure 300 as well as the side surface of enclosure 300. Bottom surface 330 may also comprise one or more features, such as an annular protrusion or recess, that correspond to and match one or more features of the filter recess of the water filtration apparatus, to facilitate alignment of filter container 100 with the filter recess.

In an embodiment, one or more of openings 212, 222, and/or 332 may comprise a screen or mesh (not shown) to prevent the passage of solid materials of a certain size. In other words, a mesh may stretch across each opening. For example, openings 212 and 222 may comprise a mesh to prevent the entry of certain solids from an unfiltered water tank into the interior of filter container 100 and/or prevent the exit of such solids from the interior of filter container 100 into the unfiltered water tank. Similarly, openings 332 may comprise a mesh to prevent the exit of certain solids from the interior of filter container 100 into a filtered water tank and/or prevent the entry of such solids from the filtered water tank into the interior of filter container 100. The spacing of the mesh may be designed to prevent the passage of a certain size of solid material. For example, the spacing of the mesh in openings 332 may be sized according to the minimum size of a piece of activated carbon, to thereby prevent activated carbon from leaking out of the interior of enclosure 300 into the filtered water tank. In an embodiment, openings 332 may comprise a mesh, whereas openings 212 and/or 222 do not comprise a mesh. Alternatively, openings 212 and/or 222 may comprise a mesh, whereas openings 332 do not comprise a mesh. Alternatively, all of openings 212, 222, and 332 may comprise a mesh.

2. Filter Pod

Figure 5:
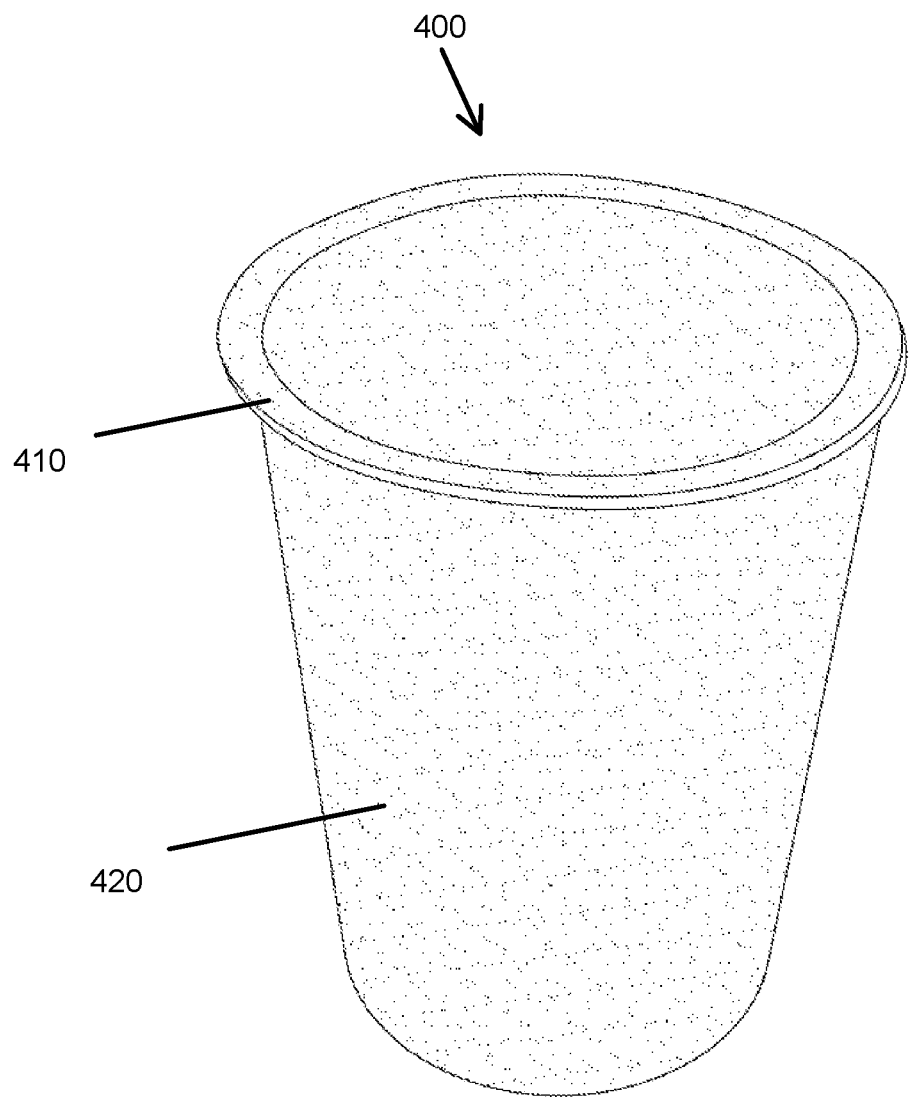
FIG. 5 illustrates a pod of activated carbon, according to an embodiment.

FIG. 5 illustrates a pod of activated carbon, according to an embodiment. In the illustrated embodiment, pod 400 comprises a peripheral portion 410 that comprises an annulus or ring that extends outward and around the circumference of the top surface of a body 420 of pod 400. Peripheral portion 410 may be configured to rest on at least an inner edge of support surface 312 of lip 310 of enclosure 300, when seated within enclosure 300. The contact between the bottom surface of peripheral portion 410 and support surface 312 may create a seal that prevents unfiltered water from infiltrating enclosure 300 (e.g., between the interior surface of enclosure 300 and the exterior surface of body 420 of pod 400).

In an embodiment, body 420 of pod 400 contains activated carbon, such as activated charcoal carbon. Pod 400 may comprise 100 g/m² filter paper formed into a housing that contains the activated carbon. The filter paper may be constructed from long, coarse pulp fiber from trees (e.g., the same material that is used to construct coffee filters). In addition, the filter paper, forming the walls of pod 400, may be tightly woven such that water can pass through the filter paper, but the activated carbon cannot pass through the filter paper. Thus, water easily flows through the filter paper into pod 400, and impurities are adsorbed by the activated carbon inside pod 400. However, the carbon inside pod 400 cannot pass through the filter paper to an exterior of pod 400. Advantageously, this prevents carbon from leaking into the filtered water tank.

Figure 6:
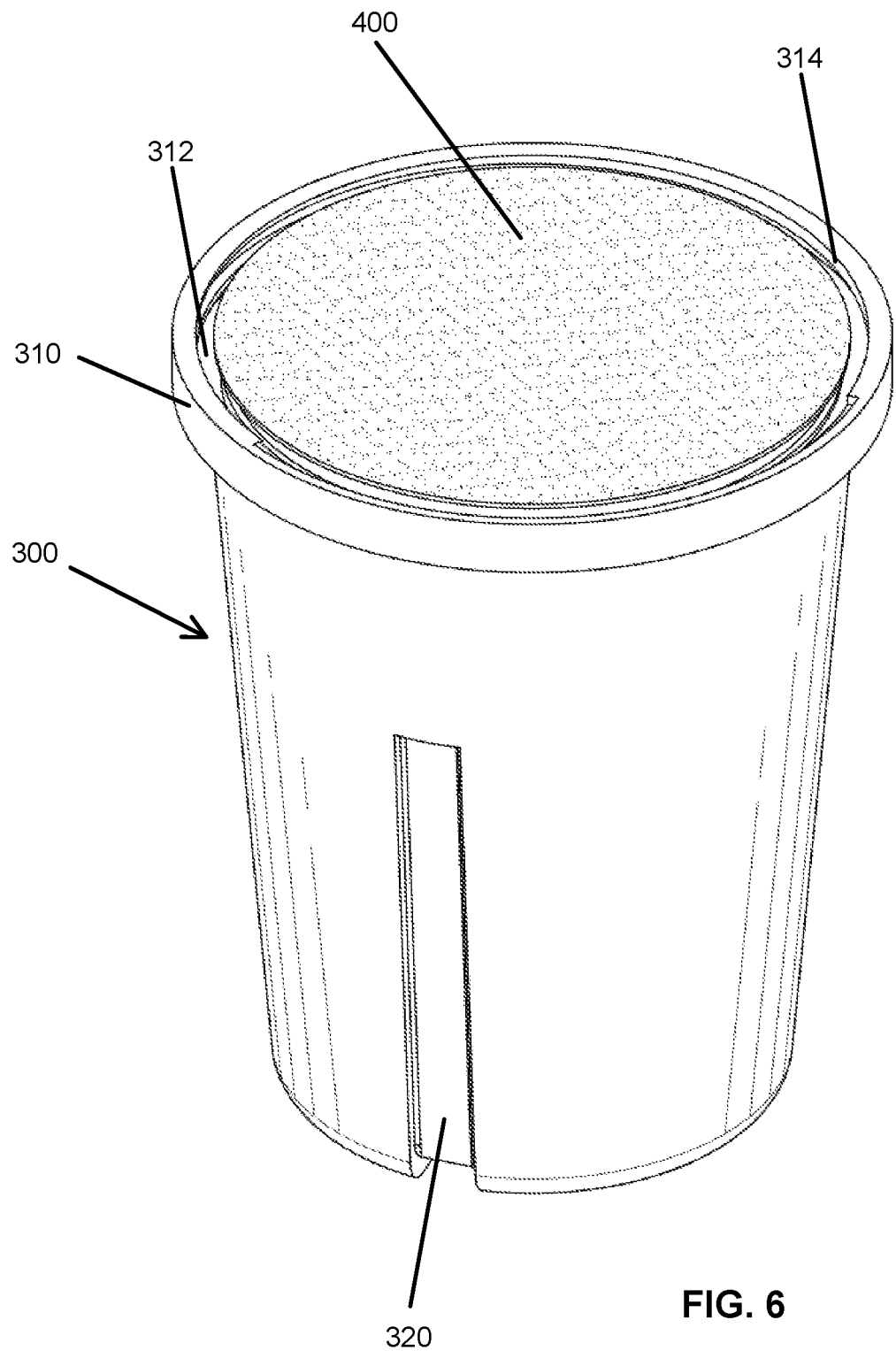
FIG. 6 illustrates a pod of activated carbon within the enclosure of an opened filter container of a water filtration apparatus, according to an embodiment.

FIG. 6 illustrates a pod of activated carbon within the enclosure of an opened filter container of a water filtration apparatus, according to an embodiment. As shown, pod 400 may substantially fill enclosure 300 from top to bottom. When fully seated within enclosure 300, the top surface of pod 400 may be flush with support surface 312, may rise slightly above and over support surface 312 (e.g., as shown in FIG. 6), or may rest slightly below support surface 312. In the illustrated embodiment pod 400 (e.g., the bottom surface of peripheral portion 410) rests on at least a portion of support surface 312 to create a seal, such that water cannot flow down through enclosure 300 without passing through pod 400. Advantageously, this ensures that all of the water has been filtered through pod 400 when it exits openings 332 in the bottom of enclosure 300. Notably, there is an annular space between threaded side portion 314 and peripheral portion 410 of pod 400, that is sized to accommodate the portion of lid 200 comprising annular threaded side portion 214, so that lid 200 and enclosure 300 may be attached to each other and detached from each other while pod 400 is seated within enclosure 300.

Advantageously, pod 400 may be easily removable from enclosure 300 when filter container 100 is open. For example, pod 400 may be configured so that its outer diameter is smaller than the inner diameter of enclosure 300, such that there is little contact or friction between the exterior surface of pod 400 and the interior surface of enclosure 300. This will allow pod 400 to easily slide out when enclosure 300 is turned upside down without lid 200, or when pod 400 is pulled from enclosure 300 (e.g., by the consumer's fingers being inserted into the annular space between threaded side portion 314 and peripheral portion 410 of pod 400). Alternatively, pod 400 may fit more tightly within enclosure 300, but may be easily pushed out (e.g., by turning enclosure 300 upside down and inserting something through openings 332 to push pod 400 out of enclosure 300). On the other hand, when lid 200 is attached to enclosure 300, the force of lid 200 on the top surface of pod 400 may substantially prevent pod 400 from sliding or otherwise moving within enclosure 300. Accordingly, it is easy to insert a pod 400 into filter container 100, as well as to remove an old, used pod 400 from filter container 100, for example, to be replaced by insertion of a new pod 400 or to facilitate recycling of filter container 100.

3. Example Dimensions

Figure 7:
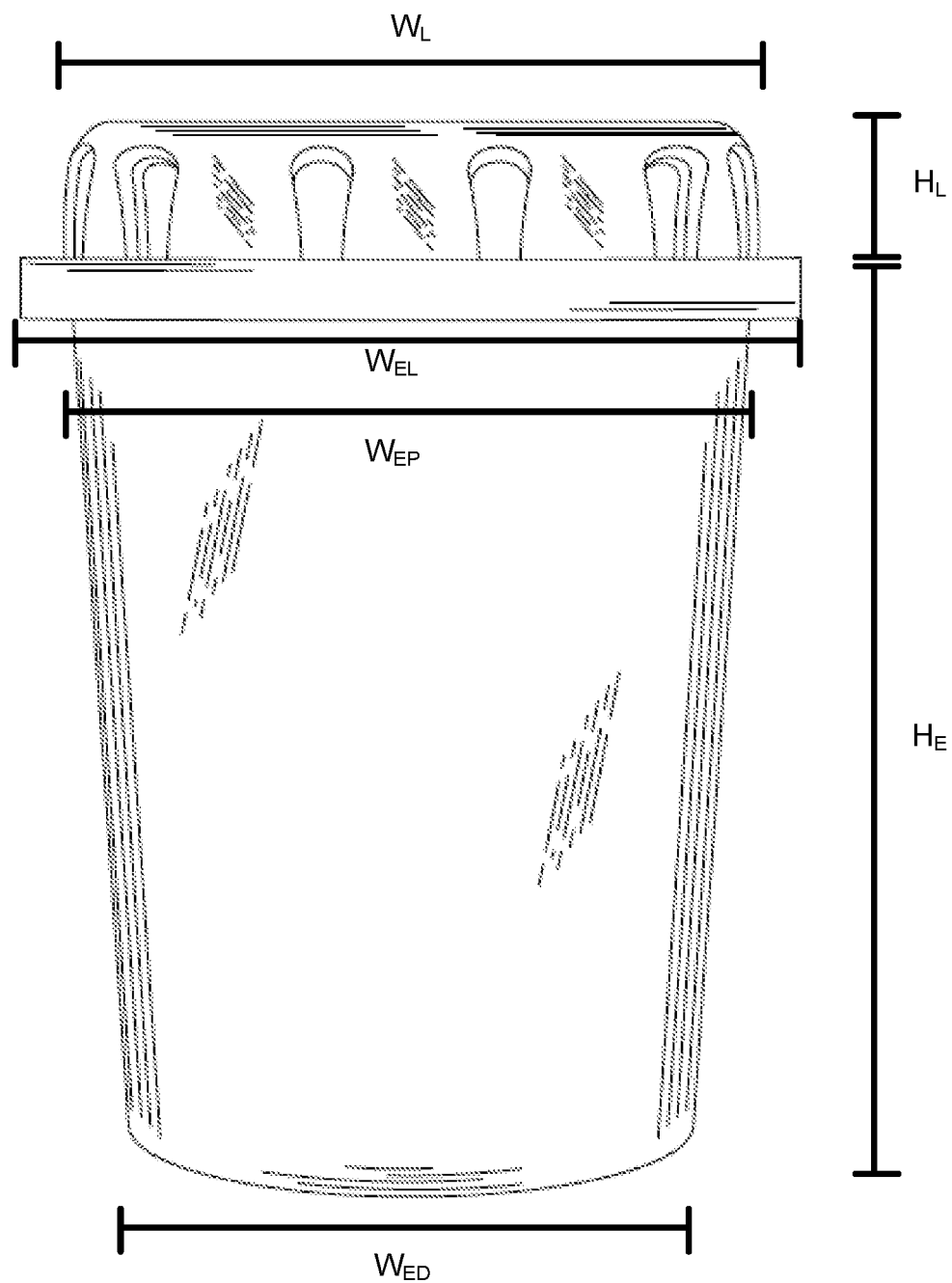
FIG. 7 illustrates various example dimensions of a filter container for a water filtration pitcher, according to an embodiment.

FIG. 7 illustrates various example dimensions of a filter container for a water filtration pitcher, according to an embodiment. As shown, $H_L$ represents the height of lid 200, and $W_L$ represents the width or diameter of the bottom surface of lid 200. Furthermore, $H_E$ represents the height of enclosure 300, $W_{ED}$ represents the width or diameter of the distal end of enclosure 300, $W_{EP}$ represents the width or diameter of the proximal end of enclosure 300, not including lip 310, and $W_{EL}$ represents the width or diameter of lip 310 of enclosure 300. Table 1 below illustrates some example values for these dimensions:

TABLE 1

| Dimension | Example Value (in centimeters) |
| --- | --- |
| $H_L$ | 1.6 |
| $W_L$ | 4.8 |
| $H_E$ | 7.97 |
| $W_{ED}$ | 4.2 |
| $W_{EP}$ | 4.7 |
| $W_{EL}$ | 5.5 |

As a broader example, $H_L$ may be between one and two centimeters, $H_E$ may be between six and nine centimeters, and $W_L$, $W_{ED}$, $W_{EP}$, and $W_{EL}$ may each be between four and six centimeters. However, it should be understood that other dimensions and ratios of dimensions are possible. For example, the particular dimensions of filter container 100 may depend on the water filtration system in which filter container 100 is to be used (e.g., the size and shape of the filter recess into which filter container 100 is to be inserted) and/or the pods 400 with which filter container 100 is to be used (e.g., the size and shape of pods 400). In an embodiment, the dimensions of filter container 100 may be selected such that filter container 100 may be used with a plurality of different water filtration system designs (e.g., different brands of water filtration pitchers) and/or pod designs (e.g., different brands of pods).

4. Alternative Embodiments

Alternative embodiments to the embodiments illustrated in FIGS. 1A-4 will now be described. Unless specifically distinguished in the following description, the following alternative embodiments should be assumed to share all of the features of the previously described embodiments. These shared features will not be redundantly discussed in the following description.

Figure 8A:
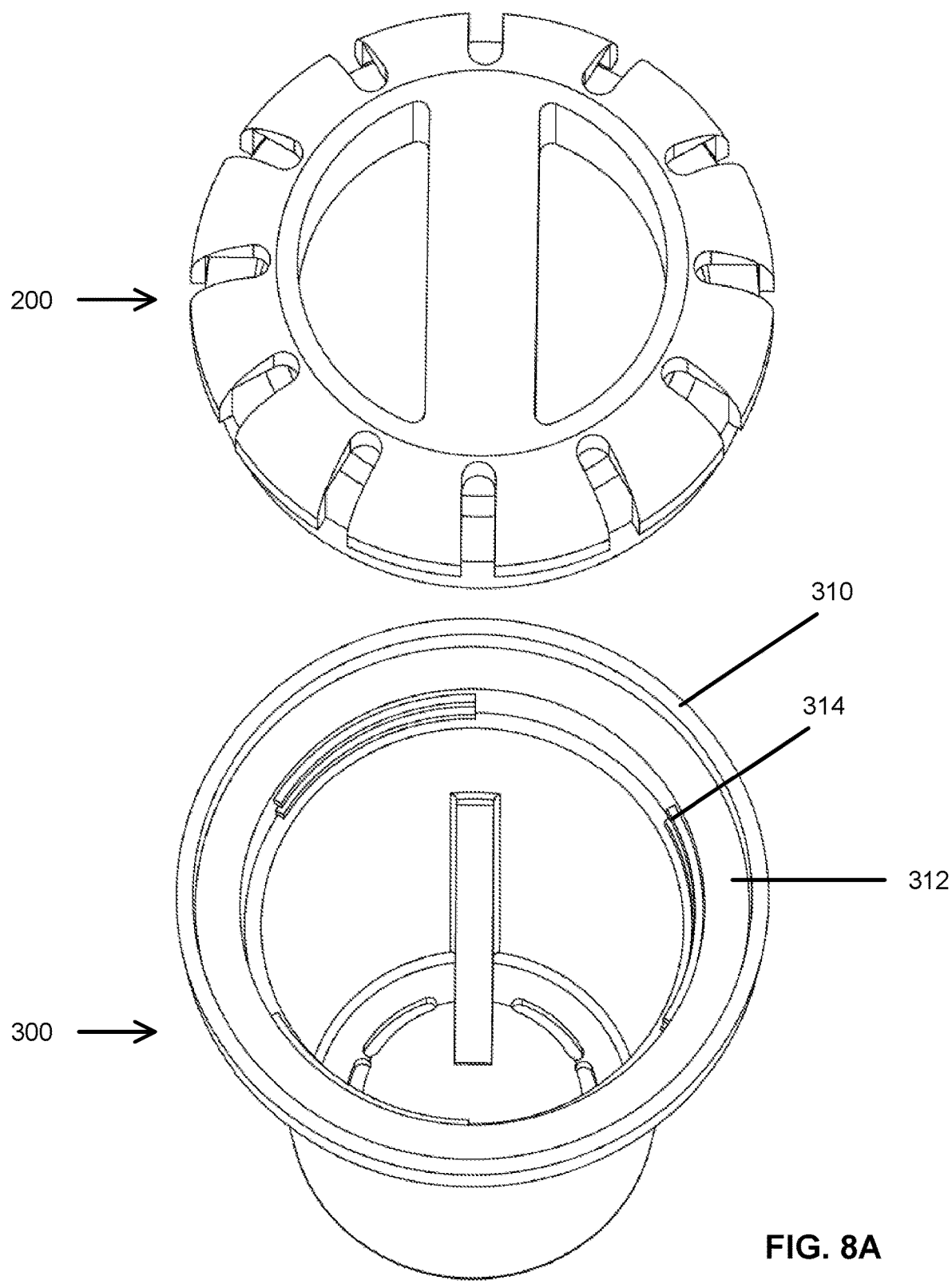
FIGS. 8A and 8B illustrate perspective views of an open filter container of a water filtration apparatus, according to an embodiment.
Figure 8B:
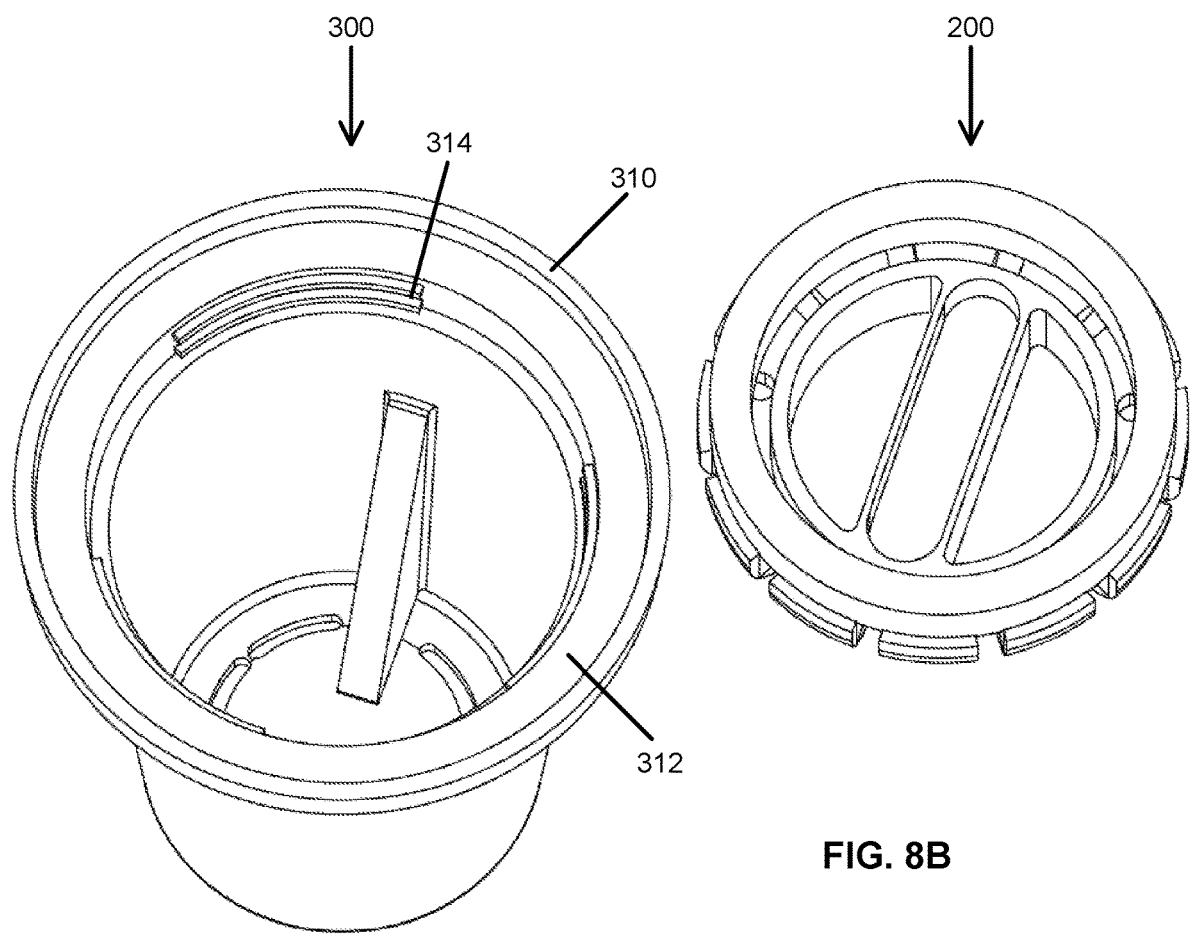

FIGS. 8A and 8B illustrate an alternative embodiment of filter container 100. Specifically, FIG. 8A illustrates a top of an opened filter container of a water filtration apparatus in perspective, as well as the top surface of the detached lid, and FIG. 8B illustrates a top of the same opened filter container, as well as the bottom surface of the detached lid, according to an embodiment. This alternative embodiment differs from the previously described embodiments only with respect to threaded side portion 314 on lip 310 of enclosure 300, and potentially the threaded side portion 214 of lid 200. Specifically, in this case, threaded side portion 314 is positioned below support surface 312 and comprises only sets of partial threads extending around two or more portions of the internal circumference of threaded side portion 314. In the illustrated embodiment, threaded side portion 314 comprises three sets of two vertically stacked threads. The three sets of threads are positioned equidistantly from each other around the internal circumference of threaded side portion 314. It should be understood that threaded side portion 314 could alternatively comprise any number of sets of threads (e.g., one, two, three, four, five, etc.) and each set of threads could comprise any number of vertically stacked threads (e.g., one, two, three, four, five, etc.). It should also be understood that threaded side portion 214 of lid 200 is configured to correspond and mate with the sets of threads in threaded side portion 314.

Figure 9A:
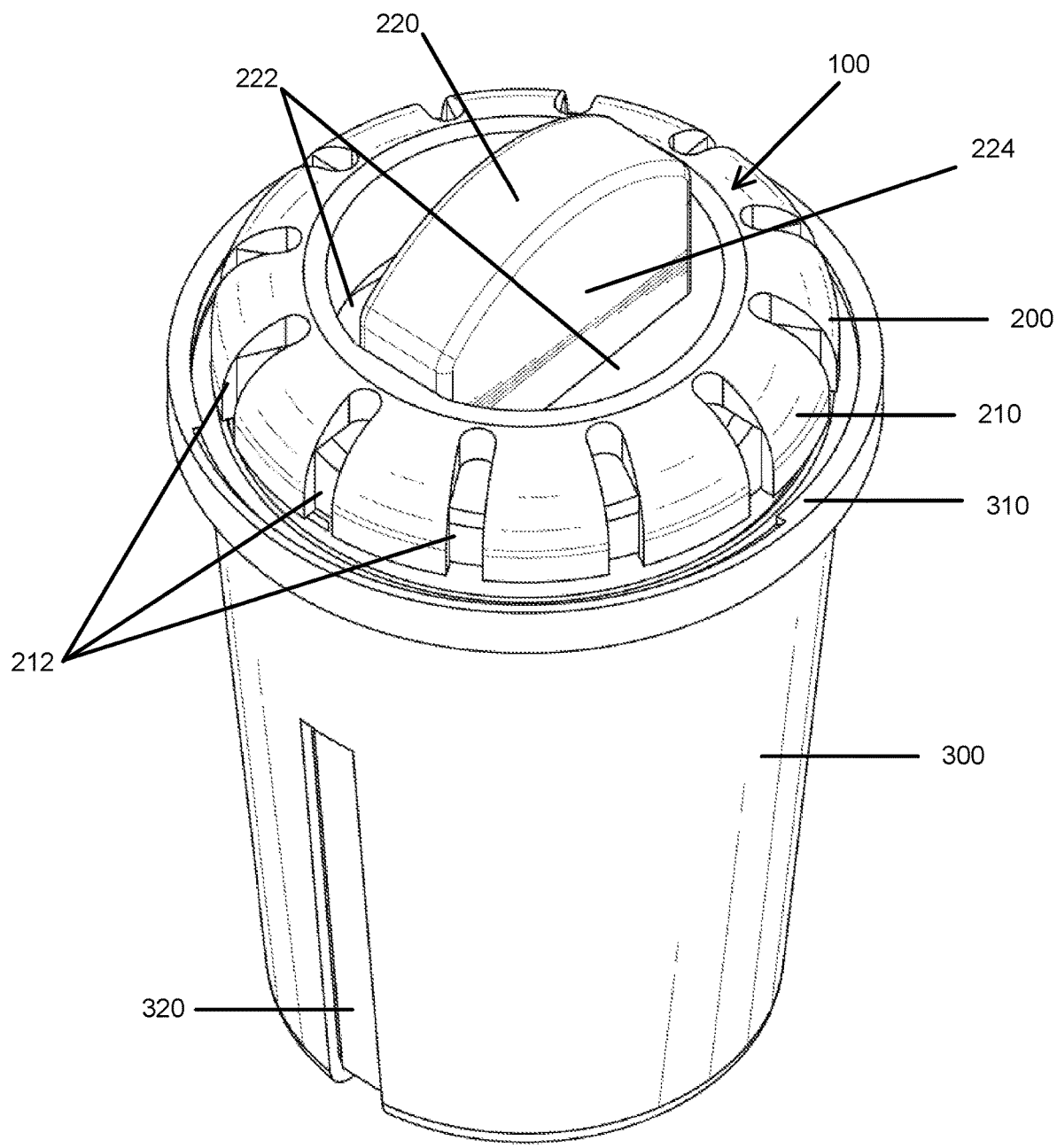
Figure 9B:
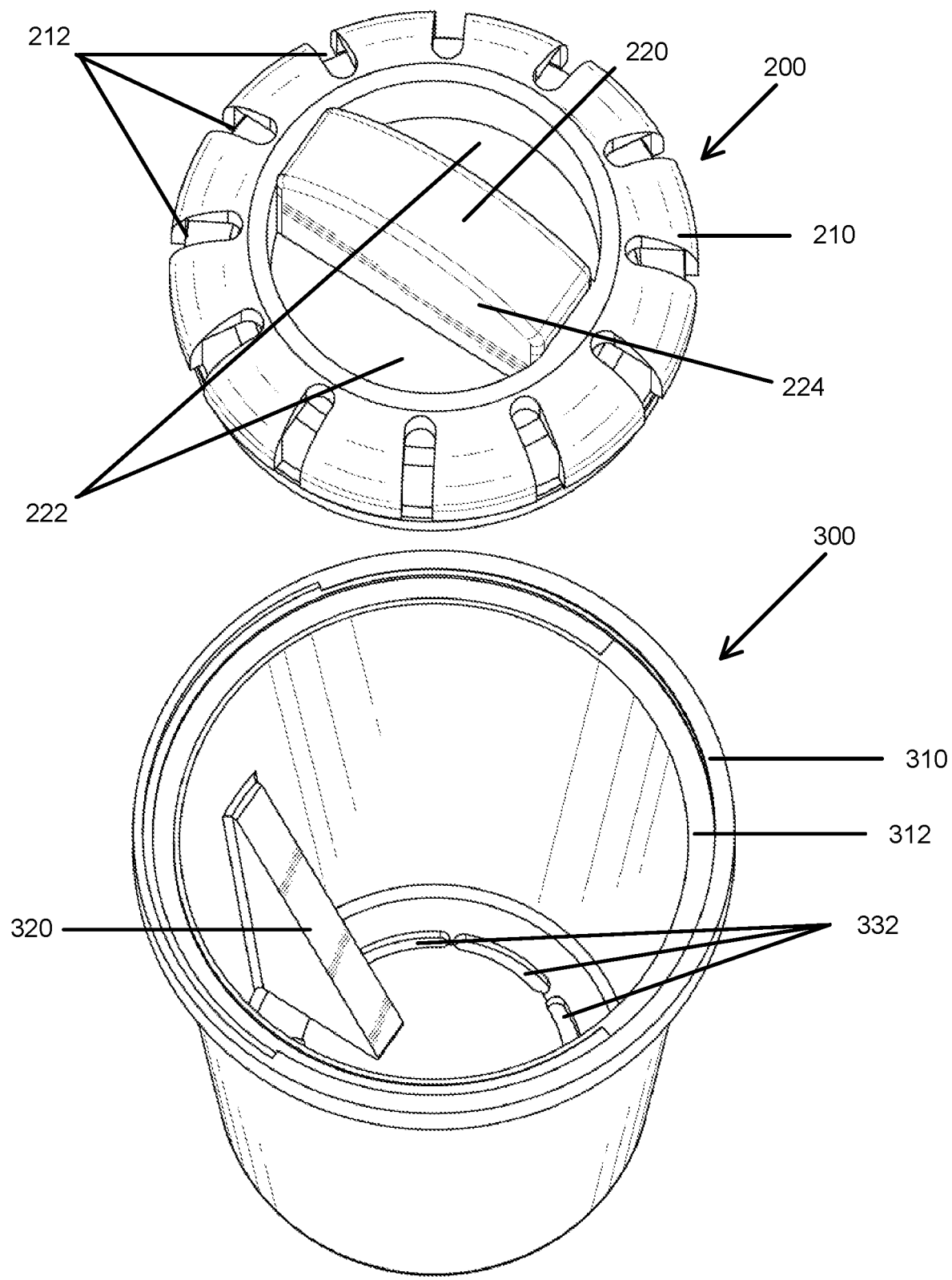
Figure 9E:
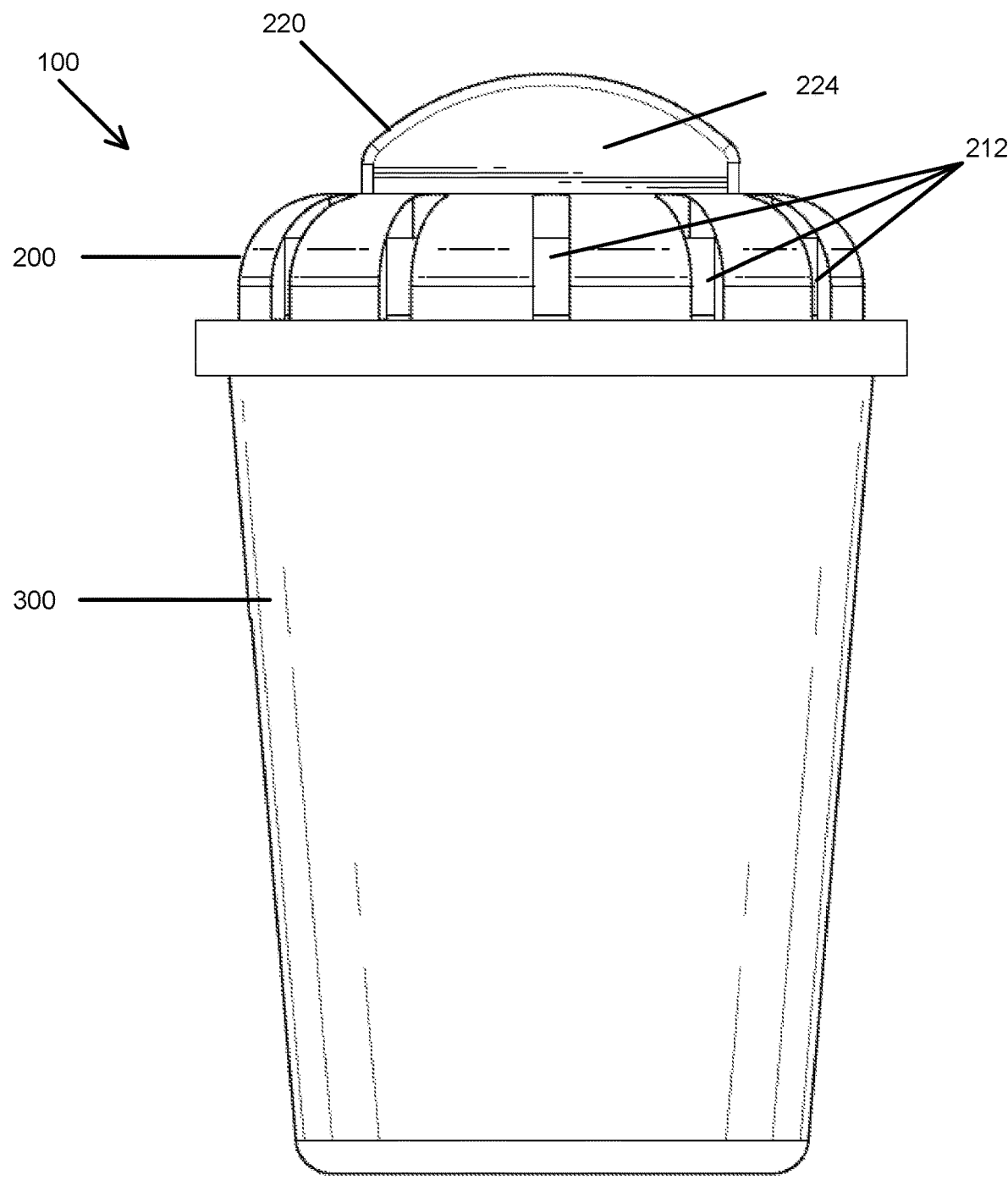

FIGS. 9A-9G illustrate an alternative embodiment of filter container 100. Specifically, FIG. 9A illustrates the top and side of a closed filter container of a water filtration system, FIG. 9B illustrates the top and side of an opened filter container of the water filtration system, FIGS. 9C-9E illustrate side views of the closed filter container, FIG. 9F illustrates a top view of the closed filter container, and FIG. 9G illustrates a bottom view of the enclosure of the closed filter container, according to an embodiment. This alternative embodiment differs from the previously described embodiments only with respect to the height of the linear handle of internal portion 220 of lid 200. Specifically, as particularly illustrated in FIGS. 9C-9E, internal portion 220 rises above peripheral portion 210 in side view to form a tab, such that side surfaces 224 of internal portion 220 extend above a top surface of peripheral portion 210. Advantageously, this allows side surfaces 224 of the tab to be gripped more easily by a consumer's fingers. In turn, this allows lid 200 to be more easily rotated by the consumer's fingers, to thereby engage or disengage the threaded portion on the bottom of peripheral portion 210 with threaded side portion 314 of enclosure 300.

5. Example Embodiments

Embodiment 1: An eco-friendly water filtration apparatus comprising: a lid comprising a plurality of lid openings; and an enclosure that is open at a first end and comprising a plurality of enclosure openings at a second end that is opposite to the first end, wherein the plurality of enclosure openings are configured to permit water to flow from an interior of the enclosure to an exterior of the enclosure, and wherein the enclosure is configured to receive and contain a pod of activated carbon while allowing or enabling removal of the pod; wherein the lid is configured to attach to the enclosure and detach from the enclosure at the first end of the enclosure, and wherein the plurality of lid openings are configured to, when the lid is attached to the enclosure, permit water to flow from an exterior of the lid to an interior of the enclosure.

Embodiment 2: The eco-friendly water filtration apparatus of Embodiment 1, wherein the lid comprises a first threaded portion, wherein the enclosure comprises a corresponding second threaded portion that is configured to mate to the first threaded portion of the lid via rotation, and wherein the lid attaches to the enclosure via mating of the first and second threaded portions.

Embodiment 3: The eco-friendly water filtration apparatus of Embodiment 2, wherein the second threaded portion comprises a plurality of sets of vertically stacked threads that are arranged equidistantly from each other around a top internal circumference of the enclosure.

Embodiment 4: The eco-friendly water filtration apparatus of any one of Embodiments 1-3, wherein the lid comprises a peripheral portion and an internal portion, and wherein the peripheral portion of the lid comprises at least a first subset of the plurality of lid openings.

Embodiment 5: The eco-friendly water filtration apparatus of Embodiment 4, wherein an internal region of the lid, comprising the internal portion, comprises a second subset of the plurality of lid openings.

Embodiment 6: The eco-friendly water filtration apparatus of either Embodiment 4 or 5, wherein the lid is circular in plan view, and wherein the first subset of openings comprises a plurality of openings arranged in a circular pattern around the circumference of the lid.

Embodiment 7: The eco-friendly water filtration apparatus of Embodiment 6, wherein each opening in the first subset of openings extends longitudinally from an interior of the lid to an outer edge of the lid.

Embodiment 8: The eco-friendly water filtration apparatus of either Embodiment 6 or 7, wherein the first subset of openings comprises two or more openings that are all arranged equidistantly apart from each other.

Embodiment 9: The eco-friendly water filtration apparatus of any one of Embodiments 7-8, wherein each opening in the first subset of openings is identical to every other opening in the first subset of openings in size and shape.

Embodiment 10: The eco-friendly water filtration apparatus of Embodiment 5, wherein the lid is circular in plan view, and wherein the second subset of openings comprises two or more openings in the internal region of the lid.

Embodiment 11: The eco-friendly water filtration apparatus of Embodiment 10, wherein the internal portion of the lid comprises a linear handle, wherein the two or more openings in the internal region of the lid consist of two openings positioned on opposite sides of the linear handle and identical to each other in size and shape.

Embodiment 12: The eco-friendly water filtration apparatus of Embodiment 11, wherein each of the two openings in the internal portion of the lid are sized to receive a human finger through the opening.

Embodiment 13: The eco-friendly water filtration apparatus of either Embodiment 11 or 12, wherein each of the two openings is semicircular in shape.

Embodiment 14: The eco-friendly water filtration apparatus of any one of Embodiments 11-13, wherein the linear handle comprises a tab that extends above a top surface of the peripheral portion in a side view of the lid.

Embodiment 15: The eco-friendly water filtration apparatus of any one of Embodiments 1-14, wherein the enclosure is substantially cylindrical with a circular cross section.

Embodiment 16: The eco-friendly water filtration apparatus of Embodiment 15, wherein a diameter of the enclosure decreases from the first end to the second end.

Embodiment 17: The eco-friendly water filtration apparatus of any one of Embodiments 1-16, wherein the enclosure comprises a bottom surface at the second end, and wherein the bottom surface comprises the plurality of enclosure openings.

Embodiment 18: The eco-friendly water filtration apparatus of Embodiment 17, wherein the plurality of enclosure openings on the bottom surface of the enclosure are arranged in a circular pattern around a center of the bottom surface.

Embodiment 19: The eco-friendly water filtration apparatus of Embodiment 18, wherein the plurality of enclosure openings are identical to each other in size and shape.

Embodiment 20: The eco-friendly water filtration apparatus of any one of Embodiments 1-19, wherein the enclosure comprises at least one feature configured to mate with a corresponding feature in a filter recess in a water filtration pitcher.

Embodiment 21: The eco-friendly water filtration apparatus of Embodiment 20, wherein the at least one feature comprises a recess in an exterior surface of the enclosure with a corresponding protrusion in an interior surface of the enclosure.

Embodiment 22: The eco-friendly water filtration apparatus of Embodiment 21, wherein a depth of the recess at an end closer to the first end of the enclosure is less than a depth of the recess at an end closer to the second end of the enclosure, such that the corresponding protrusion in the interior surface of the enclosure is sloped towards a bottom surface of the enclosure.

Embodiment 23: The eco-friendly water filtration apparatus of any one of Embodiments 1-22, wherein the enclosure comprises a lip surrounding the opening at the first end, and wherein the lip comprises a support surface to support a periphery of a bottom surface of the lid when the lid is attached to the enclosure.

Embodiment 24: The eco-friendly water filtration apparatus of any one of Embodiments 1-23, further comprising the pod of activated carbon, wherein the pod is configured to be inserted into the enclosure and removed from the enclosure when the lid is detached from the enclosure.

Embodiment 25: The eco-friendly water filtration apparatus of Embodiment 24, wherein the pod comprises filter paper housing the activated carbon.

Embodiment 26: The eco-friendly water filtration apparatus of either Embodiment 24 or 25, wherein the enclosure comprises a lip surrounding the opening at the first end, wherein the lip comprises a support surface, wherein the pod comprises an annular peripheral portion at one end, and wherein at least a portion of the support surface of the lip contacts and supports a bottom surface of the peripheral portion of the pod when the pod is inserted into the enclosure.

Embodiment 27: A water filtration system comprising: an unfiltered water tank; a filtered water tank; a filter recess positioned between the unfiltered water tank and the filtered water tank; and the water filtration apparatus of any one of Embodiments 1-26, wherein the water filtration apparatus is configured to be removably seated within the filter recess.

Embodiment 28: The water filtration system of Embodiment 27, wherein the water filtration system is a water filtration pitcher, and wherein the filtered water tank comprises a spout for pouring water.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. An eco-friendly water filtration apparatus comprising:
a lid that is circular in plan view, wherein the lid comprises a peripheral portion and an internal portion, wherein the peripheral portion comprises a plurality of first lid openings arranged in a circular pattern around the circumference of the lid, wherein the internal portion comprises two semicircular openings spaced apart on opposite sides of the internal portion so as to form a linear handle between the two semicircular openings, and wherein each of the two semicircular openings is sized to receive a human finger through the semicircular opening; and
an enclosure that is open at a first end and comprising a plurality of enclosure openings at a second end that is opposite to the first end, wherein the plurality of enclosure openings are configured to permit water to flow from an interior of the enclosure to an exterior of the enclosure, and wherein the enclosure is configured to receive and contain a pod of activated carbon while allowing removal of the pod;
wherein the lid is configured to attach to the enclosure and detach from the enclosure at the first end of the enclosure, and wherein the plurality of first lid openings and the two semicircular opening are configured to, when the lid is attached to the enclosure, permit water to flow from an exterior of the lid to an interior of the enclosure.

2. The eco-friendly water filtration apparatus of claim 1, wherein the lid comprises a first threaded portion, wherein the enclosure comprises a corresponding second threaded portion that is configured to mate to the first threaded portion of the lid via rotation, and wherein the lid attaches to the enclosure via mating of the first and second threaded portions.

3. The eco-friendly water filtration apparatus of claim 1, wherein the plurality of first lid openings are all arranged equidistantly apart from each other, and wherein each opening in the plurality of first lid openings extends longitudinally from an interior of the lid to an outer edge of the lid.

4. The eco-friendly water filtration apparatus of claim 3, wherein each opening in the plurality of first lid openings is identical to every other opening in the plurality of first lid openings in size and shape.

5. The eco-friendly water filtration apparatus of claim 1, wherein the enclosure is circular in cross section, and wherein a diameter of the enclosure decreases from the first end to the second end.

6. The eco-friendly water filtration apparatus of claim 5, wherein the enclosure comprises a bottom surface at the second end, and wherein the bottom surface comprises the plurality of enclosure openings.

7. The eco-friendly water filtration apparatus of claim 6, wherein the plurality of enclosure openings on the bottom surface of the enclosure are arranged in a circular pattern around a center of the bottom surface, and wherein the plurality of enclosure openings are identical to each other in size and shape.

8. The eco-friendly water filtration apparatus of claim 1, wherein the enclosure comprises at least one feature configured to mate with a corresponding feature in a filter recess in a water filtration pitcher.

9. The eco-friendly water filtration apparatus of claim 8, wherein the at least one feature comprises a recess in an exterior surface of the enclosure with a corresponding protrusion in an interior surface of the enclosure.

10. The eco-friendly water filtration apparatus of claim 9, wherein a depth of the recess at an end closer to the first end of the enclosure is less than a depth of the recess at an end closer to the second end of the enclosure, such that the corresponding protrusion in the interior surface of the enclosure is sloped towards a bottom surface of the enclosure.

11. The eco-friendly water filtration apparatus of claim 1, wherein the enclosure comprises a lip surrounding the opening at the first end, and wherein the lip comprises a support surface to support a periphery of a bottom surface of the lid when the lid is attached to the enclosure.

12. The eco-friendly water filtration apparatus of claim 1, further comprising the pod of activated carbon, wherein the pod is configured to be inserted into the enclosure and removed from the enclosure when the lid is detached from the enclosure.

13. The eco-friendly water filtration apparatus of claim 12, wherein the pod comprises filter paper housing the activated carbon.

14. The eco-friendly water filtration apparatus of claim 12, wherein the enclosure comprises a lip surrounding the opening at the first end, wherein the lip comprises a support surface, wherein the pod comprises an annular peripheral portion at one end, and wherein at least a portion of the support surface of the lip contacts and supports a bottom surface of the peripheral portion of the pod when the pod is inserted into the enclosure.

15. A water filtration system comprising:
an unfiltered water tank;
a filtered water tank;
a filter recess positioned between the unfiltered water tank and the filtered water tank; and
the water filtration apparatus of claim 1, wherein the water filtration apparatus is configured to be removably seated within the filter recess.

16. The water filtration system of claim 15, wherein the water filtration system is a water filtration pitcher, and wherein the filtered water tank comprises a spout for pouring water.

* * * * *